United States Patent
Li et al.

(10) Patent No.: US 12,389,472 B2
(45) Date of Patent: Aug. 12, 2025

(54) METHOD FOR SWITCHING PAIRING IN MESH NETWORK SYSTEM

(71) Applicant: Realtek Semiconductor Corp., Hsinchu (TW)

(72) Inventors: ZhaoMing Li, Suzhou (CN); ZuoHui Peng, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 330 days.

(21) Appl. No.: 18/338,456

(22) Filed: Jun. 21, 2023

(65) Prior Publication Data

US 2024/0015821 A1     Jan. 11, 2024

(30) Foreign Application Priority Data

Jul. 7, 2022   (CN) .......................... 202210795773.8

(51) Int. Cl.
*H04W 76/14*     (2018.01)
*H04W 40/24*     (2009.01)
*H04W 84/18*     (2009.01)

(52) U.S. Cl.
CPC ........... *H04W 76/14* (2018.02); *H04W 40/24* (2013.01); *H04W 84/18* (2013.01)

(58) Field of Classification Search
CPC ....... H04W 76/10; H04W 4/70; H04W 88/04; H04W 92/18; H04W 84/12; H04W 8/005;
(Continued)

(56) References Cited

U.S. PATENT DOCUMENTS 7,475,198 B2 *   1/2009   Finkler ................. G06F 9/5016
                                                 709/225
8,843,748 B2     9/2014   Tie et al.
(Continued)

FOREIGN PATENT DOCUMENTS

CA        2856027 A1    9/2015
CN     102056263 A      5/2011
(Continued)

OTHER PUBLICATIONS

Speicher, et al.: "Fast Layer 3 Handoffs in AODV-based IEEE 802.11 Wireless Mesh Networks"; copyright 2006; IEEE; pp. 1-5.
(Continued)

*Primary Examiner* — Ninos Donabed
(74) *Attorney, Agent, or Firm* — McClure, Qualey & Rodack, LLP

(57) ABSTRACT

Disclosed is a method for switching pairing in a mesh network system, including: selecting, by a network node, a new parent node; generating and sending, by the network node, a pairing change request packet to the new parent node when the new parent node is not an access point; adding, by the new parent node, MAC addresses of the network node and its descendant nodes to a refugee table when determining that it can provide relay services; returning, by the new parent node, a first pairing approval packet to the network node when the new parent node is a root node; forwarding, by the new parent node, the pairing change request packet upstream when the new parent node is not the root node; wherein pairing switching is successful if the network node receives the first pairing approval packet.

20 Claims, 28 Drawing Sheets

(58) Field of Classification Search
CPC ....... H04W 4/80; H04W 76/14; H04W 84/18; Y02D 30/70
See application file for complete search history.

(56) References Cited

U.S. PATENT DOCUMENTS

| | | | | |
|---|---|---|---|---|
| 9,425,970 | B2* | 8/2016 | Yagyu | ............... H04L 45/28 |
| 9,784,599 | B1* | 10/2017 | Close | ............... F16L 55/30 |
| 10,251,063 | B2 | 4/2019 | Myers et al. | |
| 11,700,576 | B2 | 7/2023 | Graul et al. | |
| 2005/0044211 | A1* | 2/2005 | Adhikari | ............... H04L 69/40 |
| | | | | 709/224 |
| 2008/0133841 | A1* | 6/2008 | Finkler | ............... G06F 9/5016 |
| | | | | 711/144 |
| 2012/0047180 | A1* | 2/2012 | Kirshenbaum | ........ G06Q 30/02 |
| | | | | 707/E17.012 |
| 2012/0191773 | A1* | 7/2012 | Appleton | ............... H04L 67/568 |
| | | | | 709/203 |
| 2012/0221604 | A1* | 8/2012 | Gao | ............... G06F 16/8373 |
| | | | | 707/E17.044 |
| 2020/0021968 | A1* | 1/2020 | Uhling | ............... H04W 8/005 |
| 2020/0021969 | A1* | 1/2020 | Uhling | ............... H04W 52/0216 |
| 2020/0351287 | A1 | 11/2020 | Lees et al. | |
| 2021/0160875 | A1* | 5/2021 | Zhang | ............... H04W 72/0453 |
| 2021/0288837 | A1 | 9/2021 | Peng et al. | |
| 2021/0332148 | A1 | 10/2021 | Wu et al. | |

FOREIGN PATENT DOCUMENTS

| | | |
|---|---|---|
| CN | 104620636 A | 5/2015 |
| CN | 107113688 A | 8/2017 |
| CN | 108200561 A | 6/2018 |
| CN | 112689337 A | 4/2021 |
| CN | 112752321 A | 5/2021 |
| CN | 114186921 A | 3/2022 |
| TW | 201933834 | 8/2019 |
| WO | 2011153830 A1 | 12/2011 |
| WO | 2019128635 A1 | 7/2019 |

OTHER PUBLICATIONS

"The Research of Multi-relay Cooperative Handover Mechanism Based on Network Coding in Wireless Network"; Dec. 2013; pp. 1-67.

* cited by examiner

| Frame control field | Duration field | Address 1 field the MAC address of the parent node of the node to be paired | Address 2 field the MAC address of the node to be paired | Address 3 field | | | Sequence control field | Frame check sequence field |
|---|---|---|---|---|---|---|---|---|
| | | | | bit0 | bit1 to bit4 | bit5 to bit47 | | |
| | | | | 1 | 0 | reserved | | |

FIG. 2

| Frame control field | Duration field | Address 1 field the MAC address of the parent node of the node to be paired | Address 2 field the MAC address of the node to be paired | Address 3 field | | | Sequence control field | Frame check sequence field |
|---|---|---|---|---|---|---|---|---|
| | | | | bit0 | bit1 to bit4 | bit5 to bit47 | | |
| | | | | 1 | 1 | reserved | | |

FIG. 3

| Frame control field | Duration field | Address 1 field the MAC address of the parent node of the node to be paired | Address 2 field the MAC address of the node to be paired | Address 3 field | | | Sequence control field | Frame check sequence field |
|---|---|---|---|---|---|---|---|---|
| | | | | bit0 | bit1 to bit4 | bit5 to bit47 | | |
| | | | | 1 | 2 | reserved | | |

FIG. 10

| Frame control field | Duration field | Address 1 field | Address 2 field | Address 3 field | Sequence control field | Address 4 field | QoS control field | HT control field | frame body field | frame check sequence field |

FIG. 15

```
┌─────────────────────────────────────────────────────────┐
│ when the root node corresponding to the new parent node is not │
│ the same as the root node corresponding to the old parent node,│
│    the root node corresponding to the new parent further        │─ 210
│    generates and sends a pairing switching packet carrying a    │
│    pairing switch identifier, the MAC addresses of the network  │
│    node and its descendant node, and a MAC address of the old   │
│      parent node to the access point, so that the access point  │
│       forwards the pairing switching packet to the old root node│
└─────────────────────────────────────────────────────────┘
                              │
                              ▼
┌─────────────────────────────────────────────────────────┐
│  after the old root node receives the pairing switching packet, it │
│      deletes the MAC addresses of the network node and its        │─ 211
│    descendant node from a refugee table stored by itself, and     │
│      generates and sends a second pairing cancellation packet     │
│         carrying the MAC addresses of the network node and its    │
│                    descendant node downstream                      │
└─────────────────────────────────────────────────────────┘
                              │
                              ▼
┌─────────────────────────────────────────────────────────┐
│     the relay node that receives the second pairing cancellation  │
│    packet deletes the MAC addresses of the network node and its   │
│    descendant node from a refugee table stored by itself, changes │─ 212
│    the sending address of the second pairing cancellation packet to│
│       the MAC address of itself, and then forwards the second      │
│      pairing cancellation packet downstream until the old parent   │
│             node receives the second pairing cancellation packet   │
└─────────────────────────────────────────────────────────┘
                              │
                              ▼
                                                              ─ 213
┌─────────────────────────────────────────────────────────┐
│    after receiving the second pairing cancellation packet, the old │
│     parent node deletes the MAC addresses of the network node      │
│       and its descendant node from a refugee table stored by itself│
└─────────────────────────────────────────────────────────┘
```

FIG. 21

```
┌─────────────────────────────────────────────────────┐
│ when the root node corresponding to the new parent  │
│ node is not the same as the root node corresponding │
│ to the old parent node, the root node corresponding │
│ to the new parent node further generates and sends  │──225
│ a second pairing cancellation packet carrying the   │
│ MAC addresses of the network node and its descendant│
│ node to the old root node, wherein a receiving      │
│ address of the second pairing cancellation packet   │
│ is the MAC address of the old parent node, and a    │
│ sending address of the second pairing cancellation  │
│ packet is the MAC address of the access point       │
└─────────────────────────────────────────────────────┘
                          │
                          ▼
┌─────────────────────────────────────────────────────┐
│ the old root node that receives the second pairing  │
│ cancellation packet deletes the MAC addresses of    │
│ the network node and its descendant node from the   │──226
│ refugee table stored by itself, changes the sending │
│ address of the second pairing cancellation packet   │
│ to the MAC address of itself, and then forwards the │
│ second pairing cancellation packet downstream       │
└─────────────────────────────────────────────────────┘
                          │
                          ▼
┌─────────────────────────────────────────────────────┐
│ the relay node that receives the second pairing     │
│ cancellation packet deletes the MAC addresses of    │
│ the network node and its descendant node from the   │
│ refugee table stored by itself, changes the sending │──227
│ address of the second pairing cancellation packet   │
│ to the MAC address of itself, and then forwards the │
│ second pairing cancellation packet downstream until │
│ the old parent node receives the second pairing     │
│ cancellation packet                                 │
└─────────────────────────────────────────────────────┘
                          │
                          ▼
┌─────────────────────────────────────────────────────┐
│ after receiving the second pairing cancellation     │──228
│ packet, the old parent node deletes the MAC         │
│ addresses of the network node and its descendant    │
│ node from the refugee table stored by itself        │
└─────────────────────────────────────────────────────┘
```

FIG. 24

```
┌─────────────────────────────────────────────────┐
│ when the root node corresponding to the new parent node is the │
│ same as the root node corresponding to the old parent node, the│──217
│ root node corresponding to the new parent node generates and   │
│ sends a third pairing cancellation packet carrying the MAC     │
│ addresses of the network node and its descendant node and the  │
│ MAC address of the new parent node downstream                  │
└─────────────────────────────────────────────────┘
                          ↓
┌─────────────────────────────────────────────────┐
│ the relay node that receives the third pairing cancellation    │
│ packet first determines whether the MAC address of itself is   │
│ the same as the MAC address of the new parent node or          │
│ determines whether the MAC address of the new parent node is   │
│ contained in the refugee table stored by itself, and then      │
│ forwards the third pairing cancellation packet downstream until│
│ the old parent node receives the third pairing cancellation    │
│ packet, wherein if it determines that the MAC address of itself│
│ is the same as the MAC address of the new parent node or the   │
│ MAC address of the new parent node is contained in the         │
│ refugee table stored by itself, the relay node changes the     │
│ sending address of the third pairing cancellation packet to the│──218
│ MAC address of itself, and then forwards the third pairing     │
│ cancellation packet downstream; if it determines that the MAC  │
│ address of itself is different from the MAC address of the new │
│ parent node or the MAC address of the new parent node is not   │
│ contained in the refugee table stored by itself, the relay node│
│ deletes the MAC addresses of the network node and its          │
│ descendant node from the refugee table stored by itself,       │
│ changes the sending address of the third pairing cancellation  │
│ packet to the MAC address of itself, and then forwards the     │
│ third pairing cancellation packet downstream                   │
└─────────────────────────────────────────────────┘
                          ↓
┌─────────────────────────────────────────────────┐
│ after receiving the third pairing cancellation packet, the old │──219
│ parent node deletes the MAC addresses of the network node      │
│ and its descendant node from the refugee table stored by itself│
└─────────────────────────────────────────────────┘
```

FIG. 28

METHOD FOR SWITCHING PAIRING IN MESH NETWORK SYSTEM

CROSS REFERENCE TO RELATED APPLICATION

This application claims the priority benefit of Chinese Patent Application Serial Number 202210795773.8, filed on Jul. 7, 2022, the full disclosure of which is incorporated herein by reference.

BACKGROUND

Technical Field

The present disclosure relates to the field of communication technologies, and in particular, to a method for switching pairing in a mesh network system.

Related Art

In recent years, with the rapid development of network technology, the mesh network has been widely used in the fields of Internet of Things (IoT), routers and the like.

In an existing mesh network, when a node takes switching action, it is disconnected with the current parent node first, then selects a new parent node to connect, and then updates a routing table of itself due to changes in the network topology of the existing mesh network.

However, there are many different networking technologies for mesh networks. Different networking technologies may have different methods for switching pairing, so that relevant nodes in the network can obtain and update node switching information at the same time to meet the data transmission requirements of the mesh network.

SUMMARY

Embodiments of the present disclosure provide a method for switching pairing in a mesh network system, which can allow a network node to quickly and efficiently switch to pairing with a new parent node, and allow the relevant nodes in a mesh network to obtain and update switching information of the network node at the same time.

In order to solve above-mentioned technical problem, the present disclosure is implemented as follows.

The present disclosure provides a method for switching pairing in a mesh network system, comprising: performing, by a network node, a scanning procedure to select a new parent node, so that a current parent node becomes an old parent node; generating and sending, by the network node, a pairing change request packet carrying a MAC address of its descendant node, a MAC address of an old root node, and a MAC address of the old parent node to the new parent node when the new parent node is not an access point, wherein a sending address of the pairing change request packet is a MAC address of the network node and a receiving address of the pairing change request packet is a MAC address of the new parent node, the old root node is a root node corresponding to the old parent node, and the pairing change request packet selectively carries the MAC address of the new parent node; adding, by the new parent node receiving the pairing change request packet, MAC addresses of the network node and its descendant node to a refugee table stored by itself when determining that it can provide relay services for the network node and its descendant node, wherein the refugee table stored by the new parent node contains MAC addresses of all subordinate nodes that the new parent node provides relay services for.

The present disclosure provides another method for switching pairing in a mesh network system, comprising: performing, by a network node, a scanning procedure to select a new parent node, so that a current parent node becomes an old parent node; generating and sending, by the network node, a pairing switching packet carrying a pairing switch identifier, MAC addresses of the network node and its descendant node, and a MAC address of the old parent node to an access point when the new parent node is the access point, so that the access point forwards the pairing switching packet to an old root node, wherein a receiving address of the pairing switching packet is a MAC address of the access point, a sending address of the pairing switching packet is the MAC address of the network node, and a destination address of the pairing switching packet is a MAC address of the old root node; deleting, by the old root node, the MAC addresses of the network node and its descendant node from a refugee table stored by itself after receiving the pairing switching packet, and generating and sending a second pairing cancellation packet carrying the MAC addresses of the network node and its descendant node downstream, wherein a receiving address of the second pairing cancellation packet is the MAC address of the old parent node, a sending address of the second pairing cancellation packet is the MAC address of the old root node, and the refugee table stored by the old root node contains MAC addresses of all subordinate nodes that the old root node provides relay services for; deleting, by a relay node receiving the second pairing cancellation packet, the MAC addresses of the network node and its descendant node from a refugee table stored by itself, changing the sending address of the second pairing cancellation packet to a MAC address of itself, and then forwarding the second pairing cancellation packet downstream until the old parent node receives the second pairing cancellation packet; and deleting, by the old parent node, the MAC addresses of the network node and its descendant node from a refugee table stored by itself after receiving the second pairing cancellation packet.

The present disclosure provides yet another method for switching pairing in a mesh network system, comprising: performing, by a network node, a scanning procedure to select a new parent node, so that a current parent node becomes an old parent node; generating and sending, by the network node, a pairing change request packet carrying a MAC address of a descendant node of the network node, a MAC address of an old root node, and a MAC address of the old parent node to the new parent node when the new parent node is not an access point, wherein a sending address of the pairing change request packet is a MAC address of the network node, a receiving address of the pairing change request packet is a MAC address of the new parent node, and the old root node is a root node corresponding to the old parent node; generating and returning, by the new parent node receiving the pairing change request packet, a first pairing approval packet to the network node after determining that the MAC addresses of the network node and its descendant node are contained in a refugee table stored by itself, and generating and sending a second pairing cancellation packet carrying the MAC addresses of the network node and its descendant node downstream, wherein the refugee table stored by the new parent node contains MAC addresses of all subordinate nodes that the new parent node provides relay services for, a sending address of the first pairing approval packet is the MAC address of the new parent node, a receiving address of the first pairing approval packet is the MAC address of the network node, a receiving address of the second pairing cancellation packet is the MAC address of the old parent node, and a sending address of the second pairing cancellation packet is the MAC address of the new parent node; wherein pairing switching is successful if the network node receives the first pairing approval packet; deleting, by a relay node receiving the second pairing cancellation packet, the MAC addresses of the network node and its descendant nodes from a refugee table stored by itself, changing the sending address of the second pairing cancellation packet to a MAC address of itself, and then forwarding the second pairing cancellation packet downstream until the old parent node receives the second pairing cancellation packet; and deleting, by the old parent node, the MAC addresses of the network node and its descendant node from a refugee table stored by itself after receiving the second pairing cancellation packet.

In the embodiments of the present disclosure, the method for switching pairing in the mesh network system can be applied to a mesh network that carries out packet forwarding based on the MAC address, and the update of the refugee tables of the relevant nodes in the mesh network is completed during the pairing switching process, which can achieve fast, stable and efficient pairing switch.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 2 is a schematic diagram of a format of a pairing request packet according to an embodiment of the present disclosure;

FIG. 3 is a schematic diagram of a format of a pairing approval packet according to an embodiment of the present disclosure;

FIG. 10 is a schematic diagram of a format of a pairing rejection packet according to an embodiment of the present disclosure;

FIG. 15 is a schematic diagram of a format of a packet generated by a station according to an embodiment the present disclosure;

FIG. 21 is a flow chart of a method for switching pairing in a mesh network system according to a second embodiment of the present disclosure;

FIG. 24 is a flow chart of a method for switching pairing in a mesh network system according to a third embodiment of the present disclosure;

FIG. 28 is a flow chart of a method for switching pairing in a mesh network system according to a fifth embodiment of the present disclosure;

DETAILED DESCRIPTION OF THE EMBODIMENTS

Figure 1:
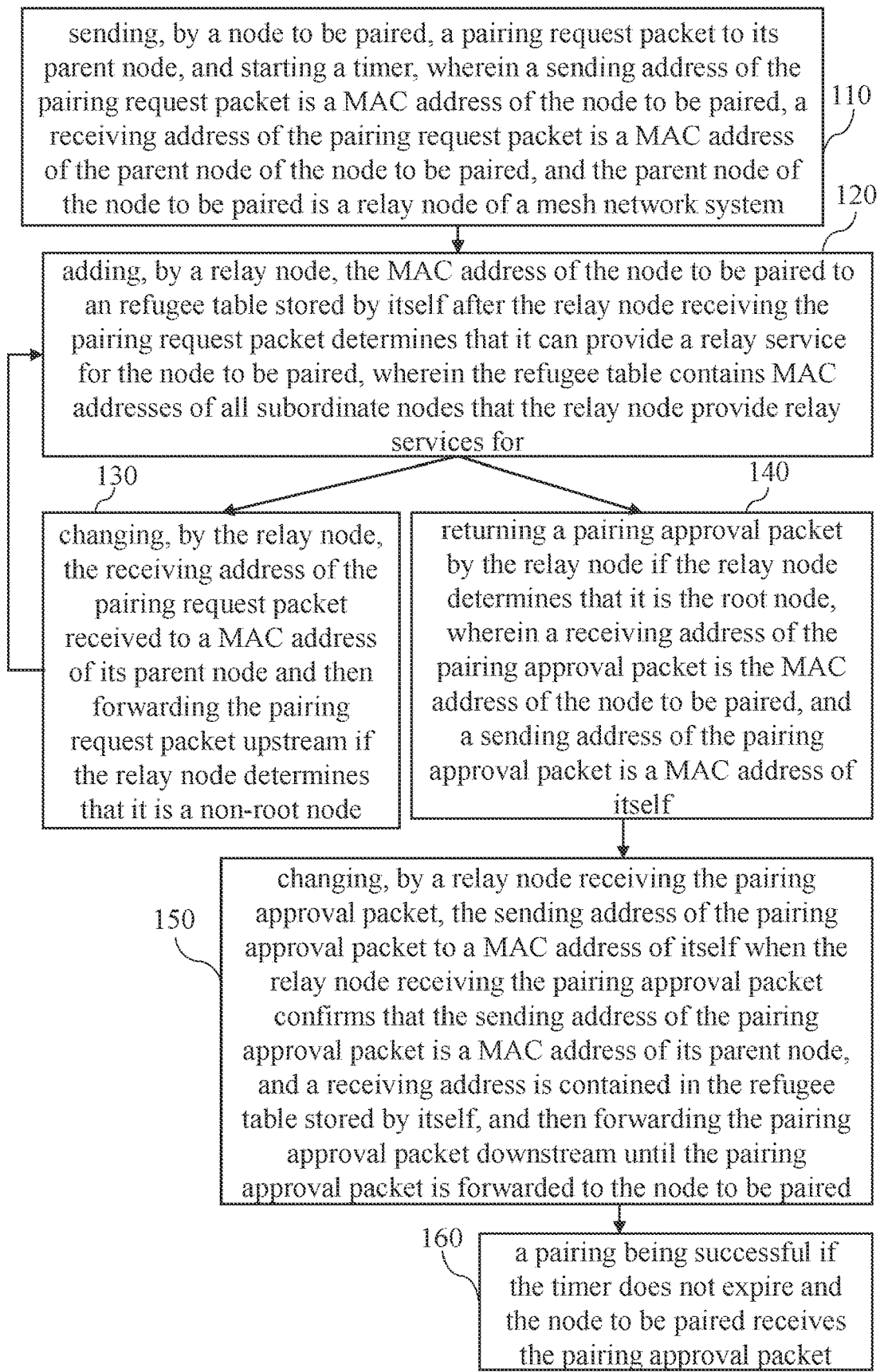
FIG. 1 is a flow chart of a method for pairing nodes according to a first embodiment of the present disclosure.

The following embodiments describe the features and advantages of the present disclosure in detail, but do not limit the scope of the present disclosure in any point of view. According to the description, claims, and drawings, a person ordinarily skilled in the art can easily understand the technical content of the present disclosure and implement it accordingly.

The embodiments of the present disclosure will be described below in conjunction with the relevant drawings. In the figures, the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as being "directly connected" or "directly coupled" to another element, there is no intervening element therebetween.

Before a method for switching pairing in a mesh network system of the present disclosure is described, the nouns of the present disclosure are explained first. The noun "mesh network system" mentioned in the present disclosure refers to a mesh communication network formed by network nodes communicating with each other. The noun "network node" refers to a computing device connected to a network with independent addressing, transmitting or receiving data capabilities, such as a workstation, a server, a terminal device, and a network device, wherein the network node with the relay function is called a relay node, and the network node without the relay function is called a station (STA). All network nodes can provide the STA function working as a station in the infrastructure mode defined by the 802.11 protocol, so the relay node can execute different programs to play the role of a station. It should be noted that, for a relay node, the MAC addresses used for the STA function and the MAC addresses used for the relay function can be the same or different.

The network node/relay node directly connected to an access point (AP) is called a root node. The network node connected to the access point through the root node is called a second-level node, the network node connected to the access point through the second-level node is called a third-level node, and so on. For two network nodes that are directly connected to each other, the upper-level network node is called a parent node of the lower-level network node, and the lower-level network node is called a child node of the upper-level network node. Each network node has only one parent node, and a parent node can have many child nodes. The root node is directly connected to the access point, and the access point can be considered as the parent node of the root node. The network node whose level is greater than the level of a certain network node is called the subordinate node of the certain network node. For example, the third-level node, the fourth-level node, and the fifth-level node are all subordinate nodes of the second-level node. All subordinate nodes that need to communicate with the access point through a certain network node are called descendant nodes of the certain network node.

In addition, the "refugee table" stored in a relay node mentioned in the present disclosure is used for recording the relevant information of the descendant nodes of the relay node, such as a MAC address and a variant on the MAC address, wherein the variant on the MAC address is the result of the hash calculation of the MAC address, or the result of the cyclic redundancy check (CRC) calculation of the MAC address. In the following embodiments, the refugee table stored in a relay node is used for recording the MAC addresses of descendant nodes of the relay node for illustration. Moreover, the "node to be paired" mentioned in the present disclosure refers to a new node that intends to join the mesh network system, which may or may not have the relay capability; when the node to be paired has the relay capability, it can have the same module and structure as the relay node, and play different roles because it executes different programs. Furthermore, the "MAC address of the access point" mentioned in the present disclosure refers to the basic service set identifier (BSSID) of the access point.

During the construction process of the mesh network system, each relay node can establish the content of the refugee table stored by itself, and each network node can confirm its own parent node. Therefore, it is necessary to explain the construction process of the mesh network system before a method for switching pairing in a mesh network system of the present disclosure is described.

In the construction process of the mesh network system, the network node as the root node can establish its connection with the access point through the existing method for pairing nodes, which is not described herein. The network node as the non-root node (hereinafter referred to as a node to be paired) can confirm its own parent node and join the mesh network system through the following method for pairing nodes, and make each relay node of the mesh network system update the content of the refugee table stored by itself.

Please refer to FIG. 1, which is a flow chart of a method for pairing nodes according to a first embodiment of the present disclosure. The method for pairing nodes comprises: sending, by a node to be paired, a pairing request packet to its parent node, wherein a sending address of the pairing request packet is a MAC address of the node to be paired, a receiving address of the pairing request packet is a MAC address of the parent node of the node to be paired, and the parent node of the node to be paired is a relay node of a mesh network system (step 110); adding, by a relay node, the MAC address of the node to be paired to an refugee table stored by itself after the relay node receiving the pairing request packet determines that it can provide a relay service for the node to be paired, wherein the refugee table contains MAC addresses of all subordinate nodes that the relay node provide relay services for (step 120); changing, by the relay node, the receiving address of the pairing request packet received to a MAC address of its parent node if the relay node is a non-root node, and then forwarding the pairing request packet upstream until the relay node receiving the pairing request packet is a root node (step 130); returning, by the relay node, a pairing approval packet if the relay node is the root node, wherein a receiving address of the pairing approval packet is the MAC address of the node to be paired, and a sending address of the pairing approval packet is a MAC address of itself (step 140); changing, by a relay node receiving the pairing approval packet, the sending address of the pairing approval packet to a MAC address of itself when the relay node receiving the pairing approval packet confirms that the sending address of the pairing approval packet is a MAC address of its parent node, and a receiving address is contained in the refugee table stored by itself, and then forwarding the pairing approval packet downstream until the pairing approval packet is forwarded to the node to be paired (step 150); a pairing being successful if the node to be paired receives the pairing approval packet (step 160). It should be noted that, when the parent node of the node to be paired is the root node, step 130 may be omitted.

In an embodiment, when the parent node of the node to be paired is a non-root node, after step 140 and before step 160, the method for pairing nodes may further comprise: changing, by the relay node receiving the pairing approval packet, the sending address of the pairing approval packet to a MAC address of itself when it confirms that the sending address of the pairing approval packet is a MAC address of its parent node and the receiving address is contained in the refugee table stored by itself, and then forwarding the pairing approval packet downstream until the pairing request packet is forwarded to the node to be paired (step 150).

Each of the format of the pairing request packet and the pairing approval packet can be a frame defined by the 802.11 protocol, such as a data frame, a management frame, a control frame, and other self-defined frames, and the pairing request packet and the pairing approval packet can use the same type of packet having different meanings or use different types of packets.

In one embodiment, the format of the pairing request packet may be a null data frame defined by the 802.11 protocol. The null data frame comprises a frame control field, a duration field, an address 1 field, an address 2 field, an address 3 field, a sequence control field, and a frame check sequence field. Specifically, sending, by the node to be paired, the pairing request packet in step 110 comprises: filling, by the node to be paired, an address 1 field in a null data frame with the MAC address of the parent node of the node to be paired, filling an address 2 field in the null data frame with the MAC address of the node to be paired, setting a first preset bit of an address 3 field in the null data frame to a first preset value to define the null data frame as a handshake frame, and setting a plurality of second preset bits of the address 3 field in the null data frame to a third preset value to define a type of the handshake frame as a pairing request, so as to generate and send the pairing request packet. In an example, the first preset bit of the address 3 field may be bit0, the first preset value may be 1 (that is, bit0 is 1), the plurality of second preset bits of the address 3 field may be bit1 to bit4, the third preset value may be 0 (that is, bit1 to bit4 are all 0), and other bits of the address 3 field (that is, bit5 to bit47) may be reserved for encoding, so that the handshake frame carries the pairing related information, as shown in FIG. 2, which is a schematic diagram of a format of a pairing request packet according to an embodiment of the present disclosure. It should be noted that although the value of bit0 of the address 3 field defined by the 802.11 protocol is 1, which indicates a multicast address, the null data frame does not include a multicast address in actual use, so that this feature can be used to allow hardware and software to easily recognize that it is the packet defined in the present disclosure.

In addition, the format of the pairing approval packet can also be a null data frame defined by the 802.11 protocol. Specifically, returning, by the relay node, a pairing approval packet if it is the root node in step 140, comprises: filling, by the root node, an address 1 field in a null data frame with the MAC address of the node to be paired, filling an address 2 field in the null data frame with a MAC address of the root node, setting a first preset bit of an address 3 field in the null data frame to a first preset value to define the null data frame as a handshake frame, and setting a plurality of second preset bits of the address 3 field in the null data frame to a fourth preset value to define a type of the handshake frame as pairing approval, so as to generate and return the pairing approval packet. In an example, the first preset bit of the address 3 field may be bit0, the first preset value may be 1 (that is, bit0 is 1), the plurality of second preset bits of the address 3 field may be bit1 to bit4, the fourth preset value may be 1 (that is, bit1 to bit3 are all 0, and bit4 is 1), and other bits of the address 3 field (that is, bit5 to bit47) may be reserved for encoding, so that the handshake frame carries the pairing related information as shown in FIG. 3, which is a schematic diagram of a format of a pairing approval packet according to an embodiment of the present disclosure.

More specifically, the description of the method for pairing nodes shown in FIG. 1 is described below in conjunction with FIG. 4 to FIG. 8 as an embodiment.

Figure 4:
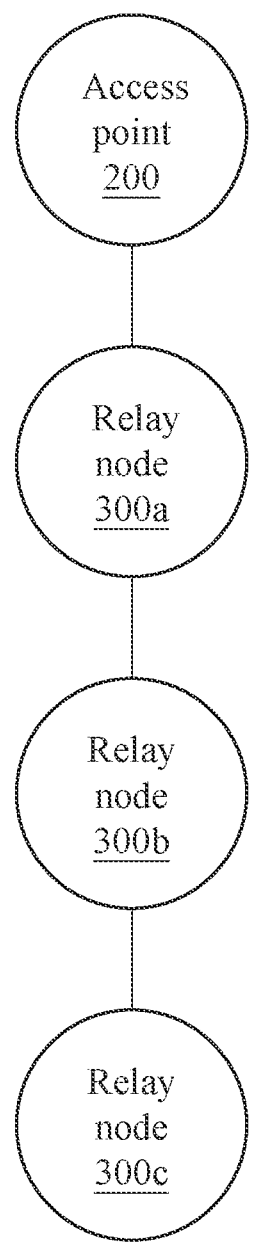
FIG. 4 is the schematic diagram of a mesh network system according to a first embodiment of the present disclosure.

Please refer to FIG. 4, which is a schematic diagram of a mesh network system according to an embodiment of the present disclosure. As shown in FIG. 4, the mesh network system 100 comprises an access point 200 and a plurality of network nodes, the plurality of network nodes can communicate with each other through the mesh network, and the plurality of network nodes comprise a plurality of relay nodes (i.e., the relay node 300*a*, the relay node 300*b*, and the relay node 300*c*), wherein the relay node 300*a* serves as the root node communicating with the access point 200, the parent node of the relay node 300*c* is the relay node 300*b*, and the parent node of the relay node 300*b* is the relay node 300*a*.

Figure 5:
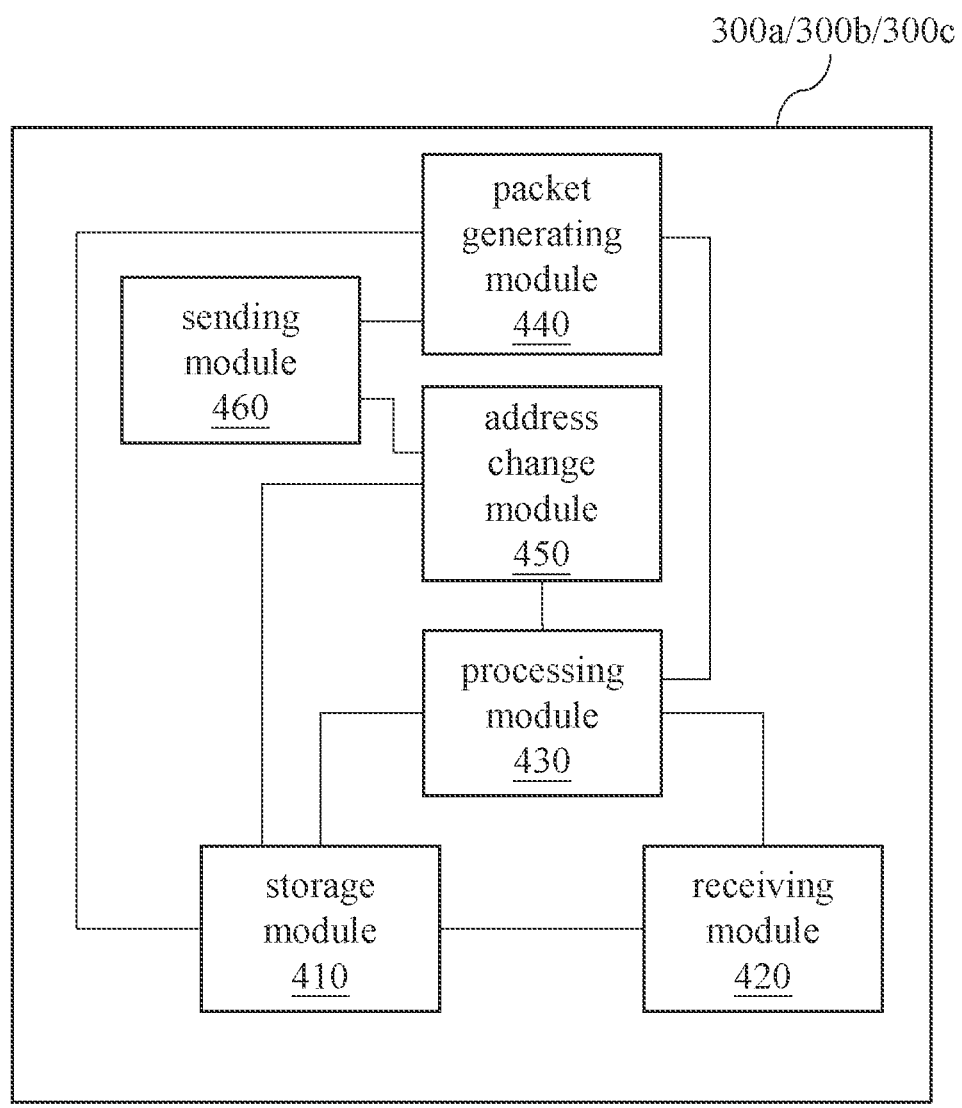
FIG. 5 is a schematic diagram of a relay node according to an embodiment of the present disclosure.

Please refer to FIG. 5, which is a schematic diagram of a relay node according to an embodiment of the present disclosure. The relay node 300*a*, the relay node 300*b* and the relay node 300*c* may all comprise: a storage module 410, a receiving module 420, a processing module 430, a packet generating module 440, an address change module 450 and a sending module 460, wherein the receiving module 420 is connected to the storage module 410, the processing module 430 is connected to the receiving module 420 and the storage module 410, the packet generation module 440 is connected to the processing module 430, the address change module 450 is connected to the storage module 410 and the processing module 430, the sending module 460 is connected to the address change module 450 and the packet generation module 440, and the storage module 410 is configured to store the refugee table. The receiving module 420, the processing module 430, the packet generating module 440, the address change module 450 and the sending module 460 may be implemented as software, hardware, and an appropriate combination thereof. The software module may be stored in a storage medium in the art, and do its work through the processor. For example, if the above-mentioned modules are all software modules, they can work by the same processor, or by different processors in any combination.

Figure 6:
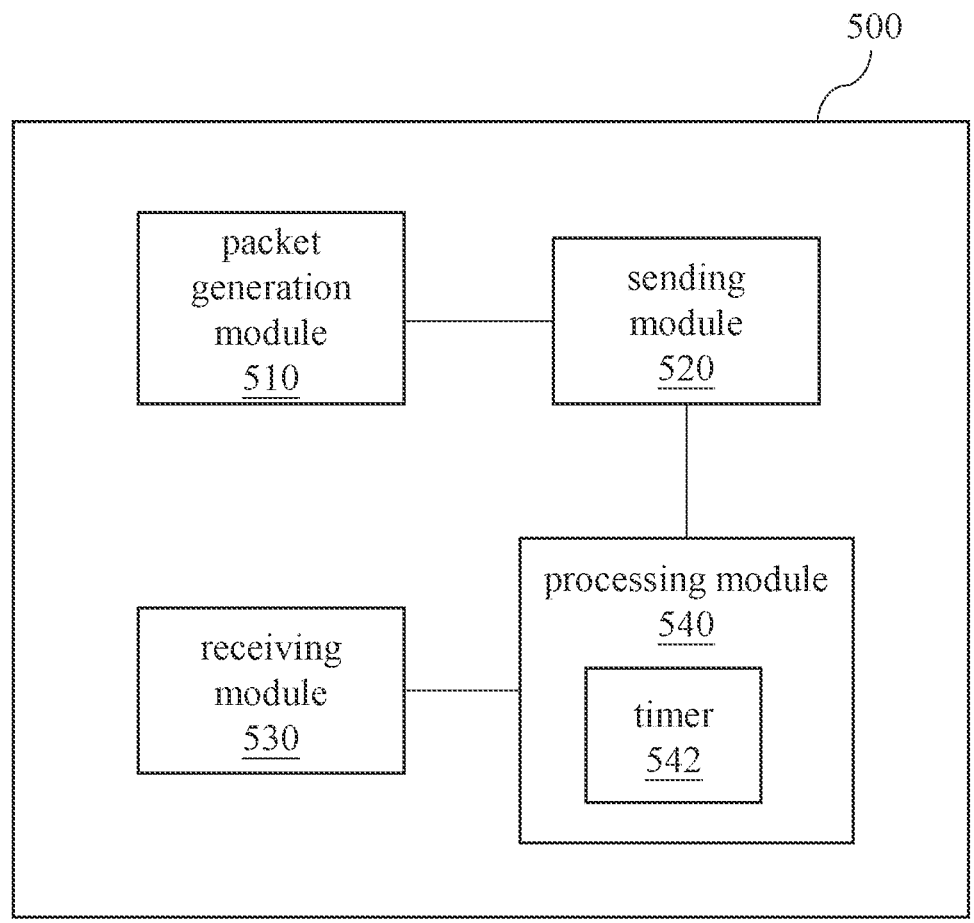
FIG. 6 is a schematic diagram of a node to be paired according to an embodiment of the present disclosure.

Please refer to FIG. 6, which is a schematic diagram of a node to be paired according to an embodiment of the present disclosure. The node to be paired 500 is a node that intends to join the mesh network system 100. The node to be paired 500 comprise a packet generation module 510, a sending module 520, a receiving module 530, and a processing module 540, wherein the sending module 520 is connected to the packet generation module 510, and the processing module 540 is connected to the sending module 520 and the receiving module 530, and the processing module 540 comprises a timer 542. The packet generation module 510, the sending module 520, the receiving module 530 and the processing module 540 can be implemented as software, hardware, and an appropriate combination thereof. The software module may be stored in a storage medium in the art, and do its work through the processor. For example, if the above-mentioned modules are all software modules, they can work by the same processor, or by different processors in any combination.

Figure 7:
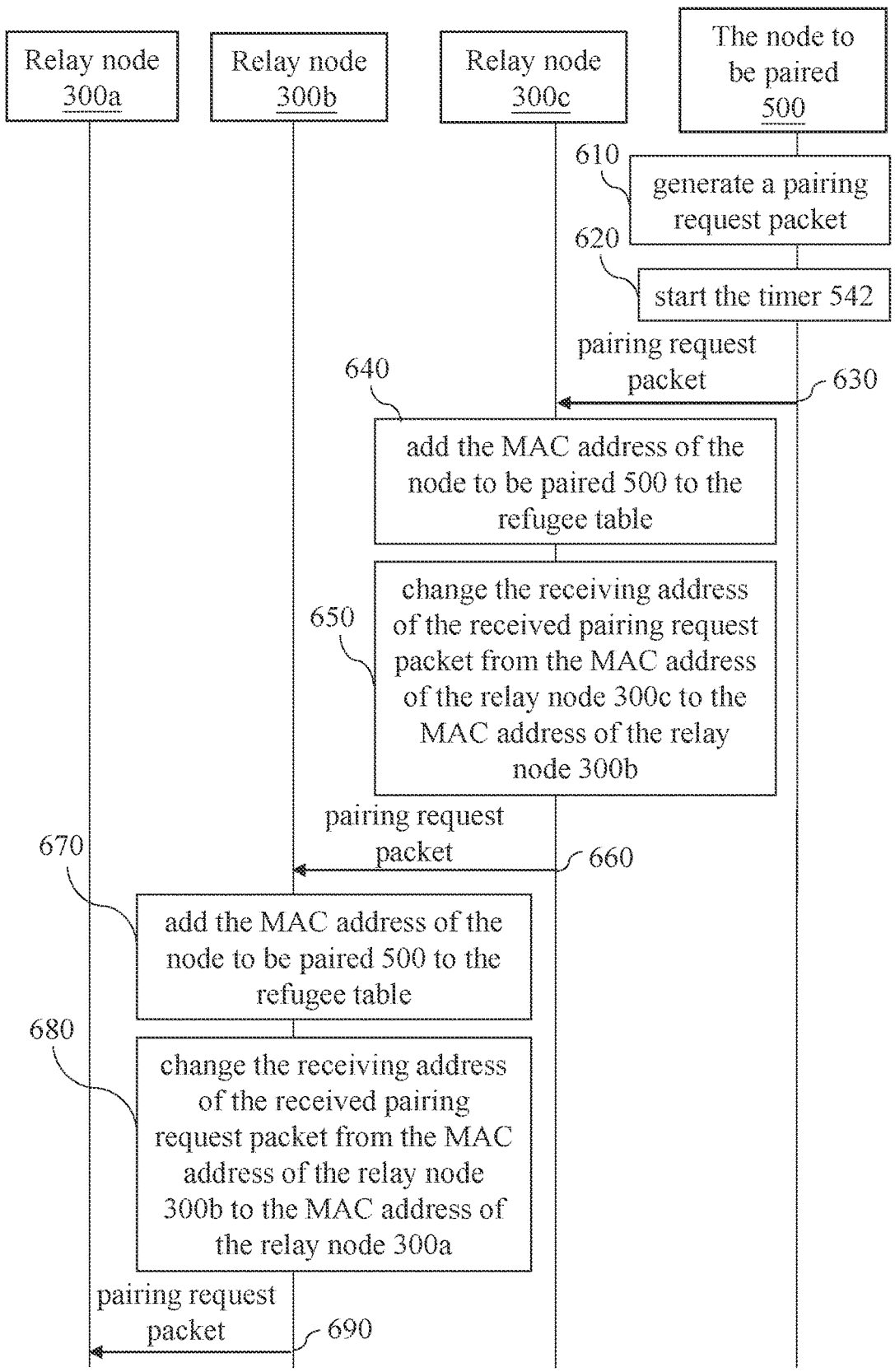
FIG. 7 and FIG. 8 are a flowchart of a first embodiment of a method for pairing nodes in which the node to be paired in FIG. 6 joins the mesh network system in FIG. 4.
Figure 8:
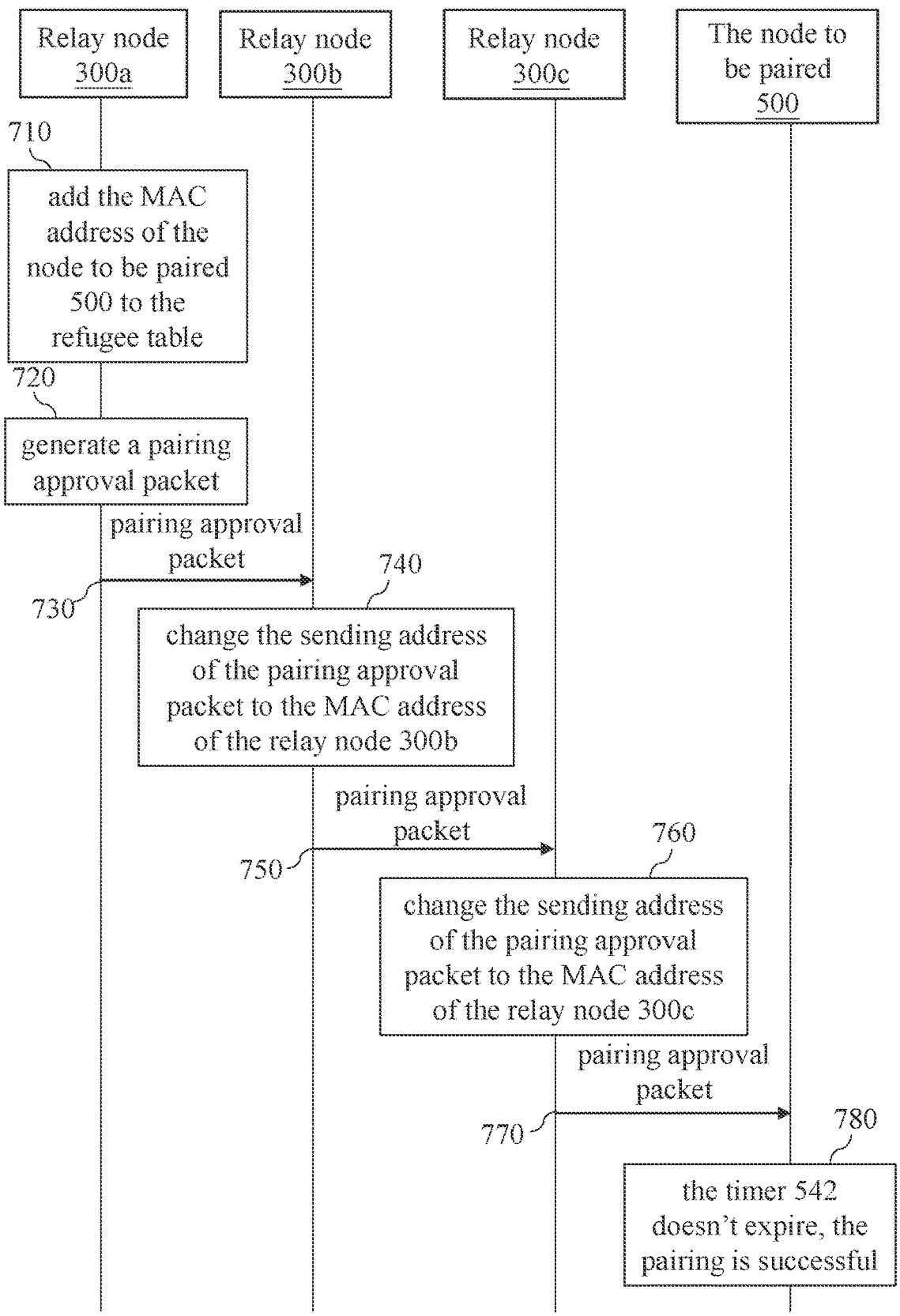

Please refer to FIG. 4 to FIG. 8, wherein FIG. 7 and FIG. 8 are a flowchart of a first embodiment of a method for pairing nodes in which the node to be paired in FIG. 6 joins the mesh network system in FIG. 4. When the to-be-paired node 500 in FIG. 6 intends to join the mesh network system 100 in FIG. 4, the to-be-paired node 500 generates a pairing request packet by the packet generation module 510 thereof (step 610), the to-be-paired node 500 sends the pairing request packet to the relay node 300*c* by the sending module 520 thereof (step 620), and starts the timer 542 of the to-be-paired node 500 (step 630), wherein the parent node of the node to be paired 500 is the relay node 300*c*, the sending address of the pairing request packet is the MAC address of the node to be paired 500, and the receiving address of the pairing request packet is the MAC address of the relay node 300c. Since the receiving address of the pairing request packet is the MAC address of the relay node 300c, the relay node 300c receives the pairing request packet by the receiving module 420. When the processing module 430 of the relay node 300c determines that it can provide the relay service for the node to be paired 500, based on the sending address of the pairing request packet being the MAC address of the node to be paired 500, the MAC address of the node to be paired 500 is added to the refugee table stored in storage module 410 of the relay node 300c (step 640), and the relay node 300c determines whether it is the root node. When the processing module 430 of the relay node 300c determines that the relay node 300c is a non-root node, the relay node 300c changes the receiving address of the received pairing request packet from the MAC address of the relay node 300c to the MAC address of the relay node 300b by the address change module 450 thereof (step 650), and the sending module 460 of the relay node 300c sends the pairing request packet with the receiving address changed by the address change module 450 to the relay node 300b (step 660).

Since the receiving address of the pairing request packet is the MAC address of the relay node 300b, the relay node 300b receives the pairing request packet by the receiving module 420 thereof. When the processing module 430 of the relay node 300b determines that the relay node 300b can provide the relay service for the node to be paired 500, based on the sending address of the pairing request packet being the MAC address of the node to be paired 500, the MAC address of the node to be paired 500 is added to the refugee table stored in the storage module 410 of the relay node 300b (step 670). When the processing module 430 of the relay node 300b determines that the relay node 300b is a non-root node, the relay node 300b changes the receiving address of the received pairing request packet from the MAC address of the relay node 300b to the MAC address of the relay node 300a by the address change module 450 thereof (step 680), and the sending module 460 of the relay node 300b sends the pairing request packet whose receiving address is changed by the address change module 450 to the relay node 300a (step 690).

Since the receiving address of the pairing request packet is the MAC address of the relay node 300a, the relay node 300a receives the pairing request packet by the receiving module 420 thereof. When the processing module 430 of the relay node 300a determines that the relay node 300a can provide the relay service for the node to be paired 500, based on the sending address of the pairing request packet being the MAC address of the node to be paired 500, the MAC address of the node to be paired 500 is added to the refugee table stored in the storage module 410 of the relay node 300a (step 710). When the processing module 430 of the relay node 300a determines that the relay node 300a is the root node, the relay node 300a generates a pairing approval packet by the packet generation module 440 thereof (step 720), and the sending module 460 of the relay node 300a sends the pairing approval packet generated by the packet generation module 440 to the relay node 300b (step 730), wherein the receiving address of the pairing approval packet is the MAC address of the node to be paired 500 and the sending address of the pairing approval packet is the MAC address of the relay node 300a.

Since the sending address of the pairing approval packet is the MAC address of the relay node 300a, and the receiving address of the pairing approval packet is contained in the refugee table stored in the storage module 410 of the relay node 300b, the relay node 300b receives the pairing approval packet by the receiving module 420 thereof, and changes the sending address of the pairing approval packet to the MAC address of the relay node 300b by the address change module 450 thereof (step 740), and the sending module 460 of the relay node 300b sends the pairing approval packet whose sending address is changed by the address change module 450 to the relay node 300c (step 750). Since the sending address of the pairing approval packet is the MAC address of the relay node 300b, and the receiving address is contained in the refugee table stored in the storage module 410 of the relay node 300c, the relay node 300c receives the pairing approval packet by receiving module 420 thereof, and changes the sending address of the pairing approval packet to the MAC address of the relay node 300c by the address change module 450 thereof (step 760), and the sending module 460 of the relay node 300c sends the pairing approval packet whose sending address is changed by the address change module 450 to the node to be paired 500 (step 770).

Since the receiving address of the pairing approval packet is the MAC address of the node to be paired 500, the node to be paired 500 receives the pairing approval packet by the receiving module 530 thereof. If the receiving module 530 of the node to be paired 500 receives the pairing approval packet, and the timer 542 of the to-be-paired node 500 does not expire, it means that the pairing is successful (step 780) (that is, the node to be paired 500 successfully joins the mesh network system 100).

Figure 9:
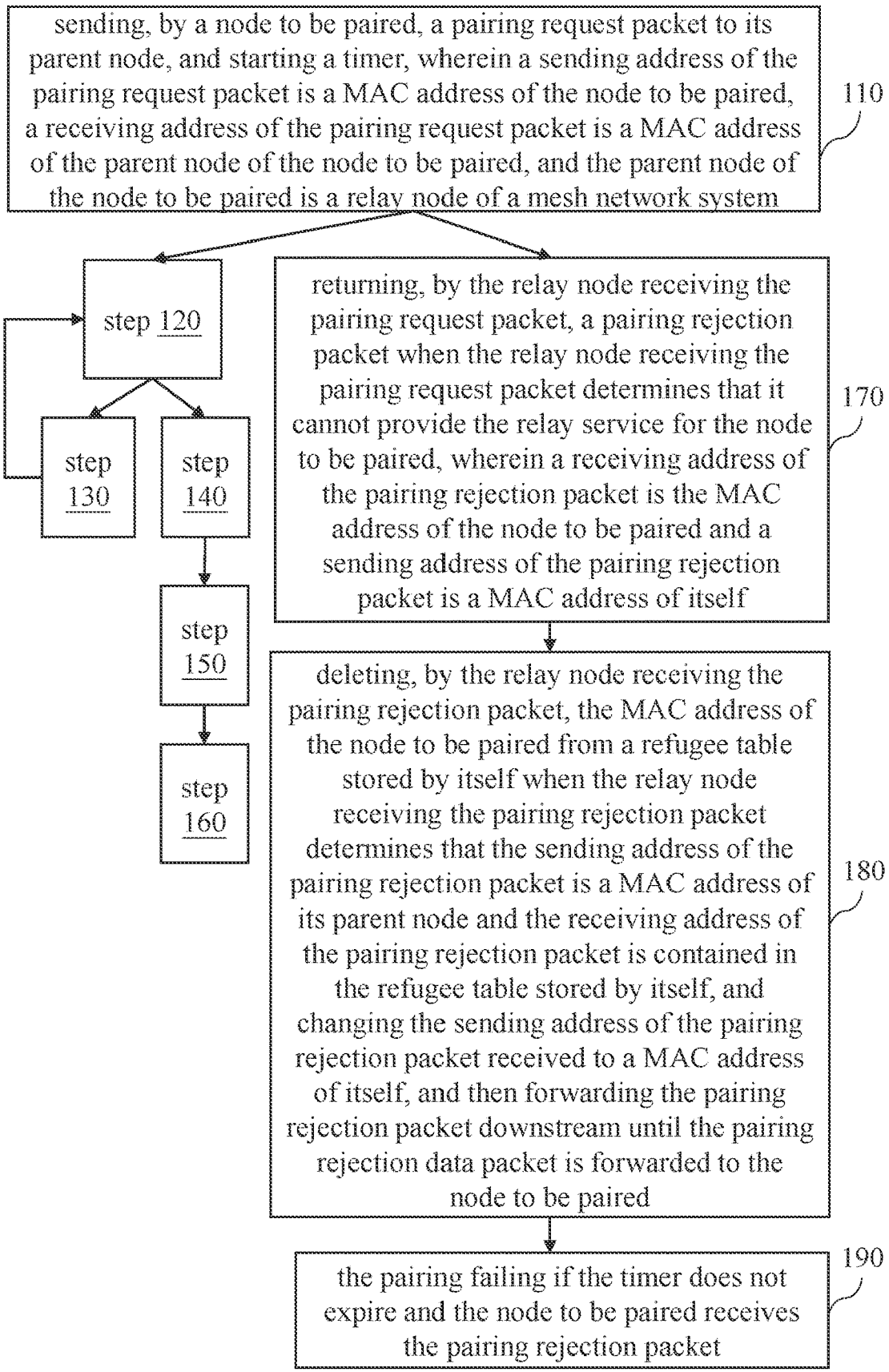
FIG. 9 is a flowchart of a method for pairing nodes according to a second embodiment of the present disclosure.

Please refer to FIG. 9, which is a flowchart of a method for pairing nodes according to a second embodiment of the present disclosure. In addition to the step 110 to step 160 described above, the method for pairing nodes may further comprise: returning, by the relay node receiving the pairing request packet, a pairing rejection packet when determining that it cannot provide the relay service for the node to be paired, wherein a receiving address of the pairing rejection packet is the MAC address of the node to be paired and a sending address of the pairing rejection packet is a MAC address of itself (step 170); and the pairing failing if the node to be paired receives the pairing rejection packet (step 190). It should be noted that, when the relay node determining that it cannot provide the relay service for the node to be paired and returning the pairing rejection packet is not the parent node of the node to be paired, after step 170 and before step 190, the method for pairing nodes may further comprise: deleting, by the relay node receiving the pairing rejection packet, the MAC address of the node to be paired from a refugee table stored by itself when determining that the sending address of the pairing rejection packet is a MAC address of its parent node and the receiving address of the pairing rejection packet is contained in the refugee table stored by itself, and changing the sending address of the pairing rejection packet received to a MAC address of itself, and then forwarding the pairing rejection packet downstream until the pairing rejection packet is forwarded to the node to be paired (step 180).

The format of the pairing rejection packet may be a data frame defined by the 802.11 protocol, such as a management frame, a control frame, and other self-defined frames. In an embodiment, the format of the pairing rejection packet may also be a null data frame defined by the 802.11 protocol. Specifically, the step 170 of returning, by the relay node receiving the pairing request packet, a pairing rejection packet when determining that it cannot provide the relay service for the node to be paired further comprises: filling, by the relay node receiving the pairing request packet, an address 1 field in a null data frame with the MAC address of the node to be paired, filling an address 2 field in the null data frame with a MAC address of itself, setting a first preset bit of an address 3 field in the null data frame to a first preset value to define the null data frame as a handshake frame, and setting a plurality of second preset bits of the address 3 field in the null data frame to a second preset value to define a type of the handshake frame as a pairing rejection, so as to generate and return the pairing rejection packet. In an example, the first preset bit of the address 3 field may be bit0, the first preset value may be 1, the plurality of second preset bits of the address 3 field may be bit1 to bit4, the second preset value may be 2 (that is, bit1, bit2, and bit4 are all 0, and bit3 is 1), and the other bits of the address 3 field (that is, bit5 to bit47) may be reserved for encoding, so that the handshake frame carries the pairing related information, as shown in FIG. 10, which is a schematic diagram of a format of a pairing rejection packet according to an embodiment of the present disclosure.

In an embodiment, the situation that the relay node determines that it cannot provide the relay service for the node to be paired may comprise but not limited to: (1) the situation where the storage capacity of the refugee table of the relay node has reached a upper limit value, so that the relay node can no longer provide relay services for more network nodes; (2) the situation where the relay node shuts down the relay service function; (3) the situation where the relay node is trying to switch to connect to other network nodes; and (4) the situation where the relay node has left the mesh network system.

It should be noted that, the relay node determining that it cannot provide the relay service for the node to be paired in step 170 may be a root node or a non-root node.

More specifically, the description of the method for pairing nodes shown in FIG. 9 is described below in conjunction with FIG. 4 to FIG. 6 and FIG. 11 as an embodiment.

Figure 11:
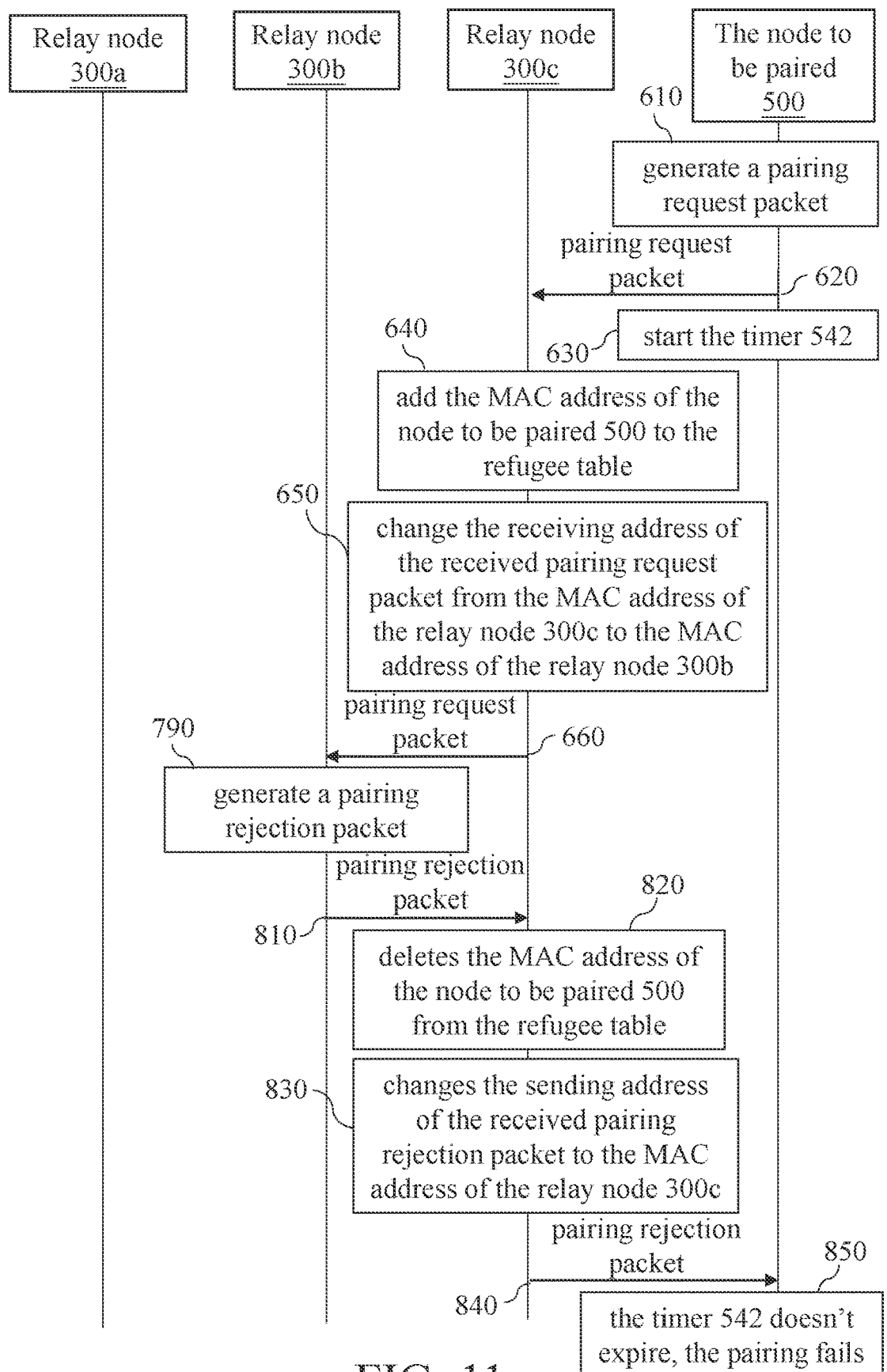
FIG. 11 is a flowchart of a second embodiment of a method for pairing nodes in which the node to be paired in FIG. 6 joins the mesh network system in FIG. 4.

Please refer to FIG. 4 to FIG. 6 and FIG. 11, wherein FIG. 11 is a flowchart of a second embodiment of a method for pairing nodes in which the node to be paired in FIG. 6 joins the mesh network system in FIG. 4. Since the difference between FIG. 11 and FIGS. 7-8 lies in the process after the relay node 300b determines that it cannot provide the relay service for the node to be paired 500, the description of the process from step 610 to step 660 will not be repeated. As shown in FIG. 11, after the relay node 300b determines that it cannot provide the relay service for the node to be paired 500 by the processing module 430 thereof, the relay node 300b generates a pairing rejection packet by the packet generation module 440 thereof (step 790), and sends the pairing rejection packet to the relay node 300c by the sending module 460 thereof (step 810), wherein the receiving address of the pairing rejection packet is the MAC address of the node to be paired 500 and the sending address of the pairing rejection packet is the MAC address of the relay node 300b. After the relay node 300c confirms that the sending address of the pairing rejection packet is the MAC address of its parent node by the processing module 430 thereof, and the receiving address of the pairing rejection packet is contained in the refugee table stored in the storage module 410 of the relay node 300c, the relay node 300c deletes the MAC address of the node to be paired 500 from the refugee table stored in the storage module 410 of the relay node 300c (step 820). Then, the relay node 300c changes the sending address of the received pairing rejection packet to the MAC address of the relay node 300c by the address change module 450 thereof (step 830). After that, the relay node 300c sends the pairing rejection packet whose sending address is changed by the address change module 450 to the node to be paired 500 by the sending module 460 thereof (step 840).

Since the receiving address of the pairing rejection packet is the MAC address of the node to be paired 500, the node to be paired 500 receives the pairing rejection packet by the receiving module 530 thereof. If the receiving module 530 of the node to be paired 500 receives the pairing rejection packet, and the timer 542 of the node to be paired 500 does not expire, it means that the pairing fails (step 850) (that is, the node to be paired 500 fails to join the mesh network system 100).

Figure 12:
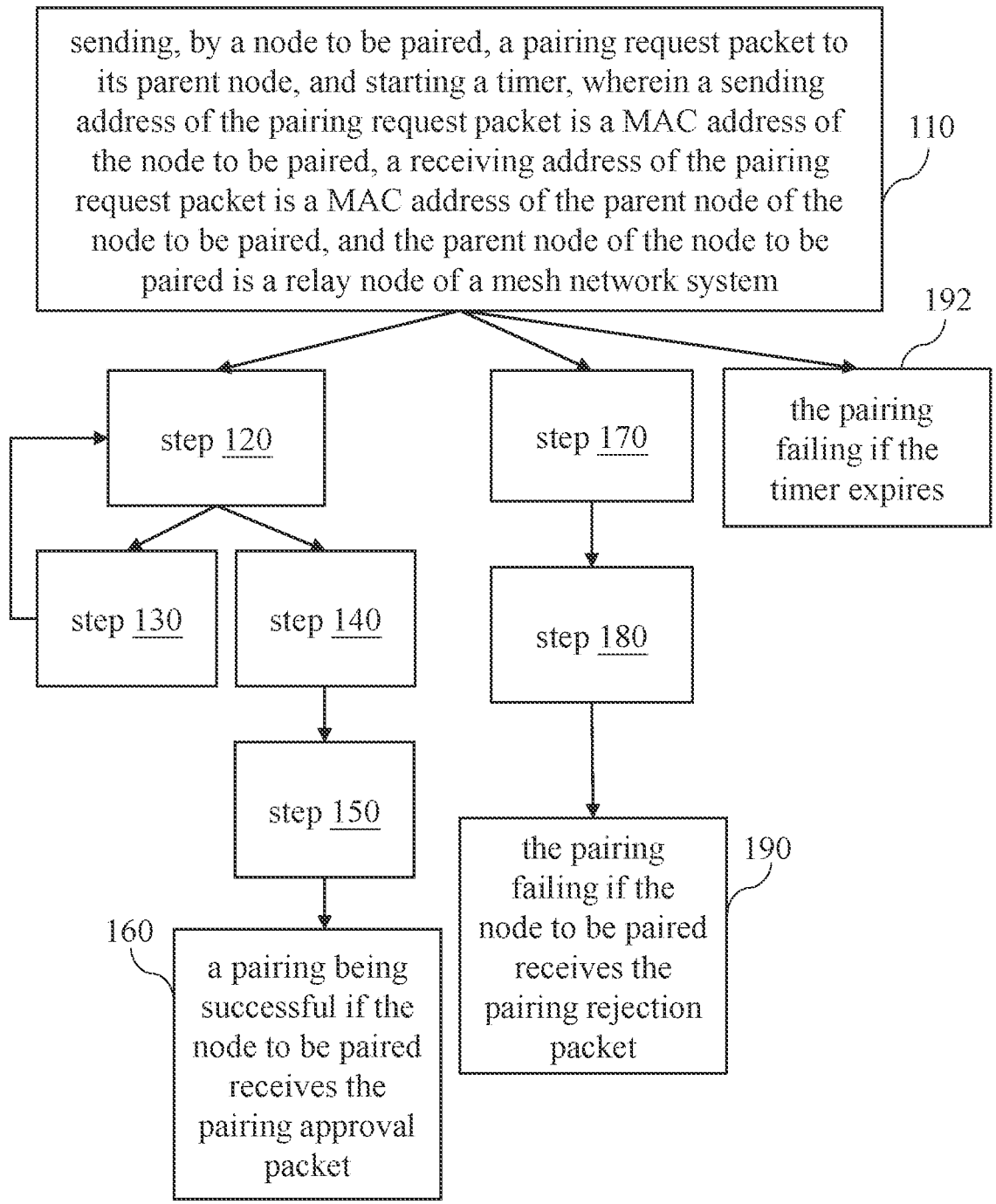
FIG. 12 is a flowchart of a method for pairing nodes according to a third embodiment of the present disclosure.

Please refer to FIG. 12, which is a flowchart of a method for pairing nodes according to a third embodiment of the present disclosure. In addition to step 110 to step 190, the method for pairing nodes may further comprise: the pairing failing if the timer expires (step 192). Specifically, if the timer expires and the node to be paired does not receive the pairing rejection packet or the pairing approval packet, it means that the pairing fails.

Figure 13:
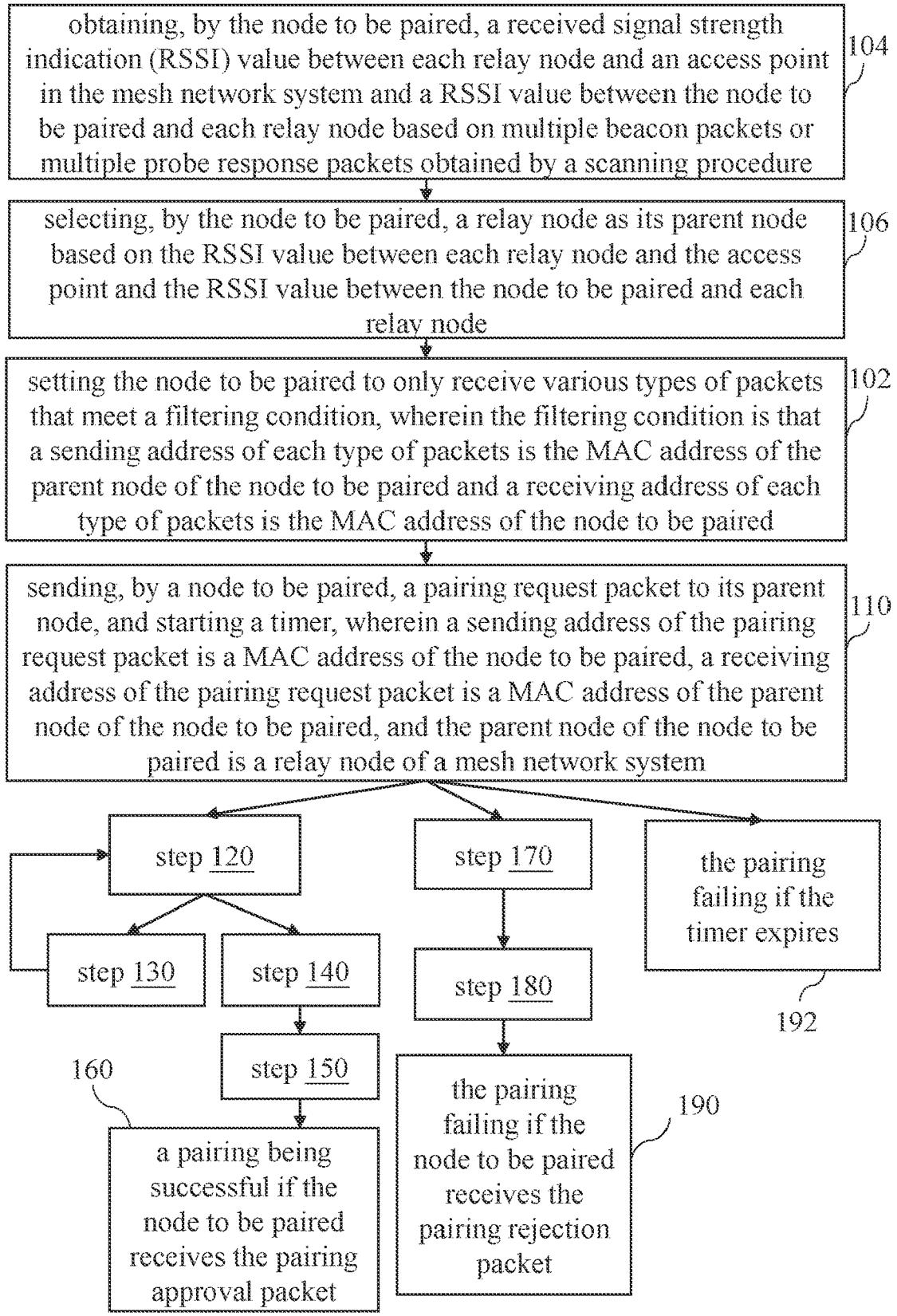
FIG. 13 is a flowchart of a method for pairing nodes according to a fourth embodiment of the present disclosure.

In one embodiment, please refer to FIG. 13, which is a flowchart of a method for pairing nodes according to a fourth embodiment of the present disclosure. Before step 110, the method for pairing nodes may further comprise: setting the node to be paired to only receive various types of packets that meet a filtering condition, wherein the filtering condition is that a sending address of each type of packets is the MAC address of the parent node of the node to be paired and a receiving address of each type of packets is the MAC address of the node to be paired (step 102).

In an embodiment, please refer to FIG. 13, before step 102, the method for pairing nodes may further comprise: obtaining, by the node to be paired, a received signal strength indication (RSSI) value between each relay node and an access point in the mesh network system and a RSSI value between the node to be paired and each relay node based on multiple beacon packets or multiple probe response packets obtained by a scanning procedure (step 104); and selecting, by the node to be paired, a relay node as its parent node based on the RSSI value between each relay node and the access point and the RSSI value between the node to be paired and each relay node (step 106).

In an example, the scanning procedure is that the node to be paired actively detects and searches each relay node of the mesh network system. Specifically, the node to be paired may send probe request frames sequentially on the channels it supports, wherein the probe request frame does not carry the SSID but may comprise vendor-defined information elements (Vendor IEs), such as the BSSID and the information requesting assistance, to detect all available relay nodes around. The relay node receiving the probe request frame sends a probe response frame to the node to be paired, wherein the probe response frame may comprise Vendor IEs, such as the BSSID, the RSSI value between itself and the access point, the MAC address of the root node it is connected to, the number of levels it is at in the mesh network system, the number of descendant nodes that provided with relay services by itself, and information that it can provide assistance. Therefore, the node to be paired can receive the probe response frame sent by each relay node through the above scanning procedure, and obtain the RSSI value between itself and each relay node and the RSSI value between each relay node and the access point, and then select a relay node as its parent node. For example, the node to be paired first selects the relay node with the best RSSI value as its parent node, but if the RSSI value between the selected relay node and the parent node thereof is poor or the RSSI value between the nodes on the uplink path of the selected relay node is poor, the node to be paired chooses the relay node with the second best RSSI value as its parent node, and so on, until the node to be paired selects a suitable relay node as its parent node.

In another example, the scanning procedure is that the node to be paired passively receives the beacon frame sent by each relay node of the mesh network system. Specifically, each relay node of the mesh network system periodically broadcasts the beacon frame, and the node to be paired can listen to the beacon frames on each channel it supports, wherein the beacon frame can comprise Vendor IEs, such as the BSSID, the RSSI value between itself and the access point, the MAC address of the root node it is connected to, the number of levels it is at in the mesh network system, the number of descendant nodes that provided with relay services by itself, and information that it can provide assistance. Therefore, the node to be paired can receive the probe response frame sent by each relay node through the above scanning procedure, and obtain the RSSI value between the node to be paired and each relay node and the RSSI value between each relay node and the access point, and then select a relay node as its parent node.

Through the methods for pairing nodes described in FIG. 1, FIG. 9, FIG. 12 and FIG. 13, the network node as the non-root node (that is, the node to be paired) can confirm its parent node and join the mesh network system, and each relay node of the mesh network system can update the content of the refugee table stored by itself, so as to construct the mesh network system, and apply to the following data transmission method and the method for switching pairing of the present disclosure.

Figure 14:
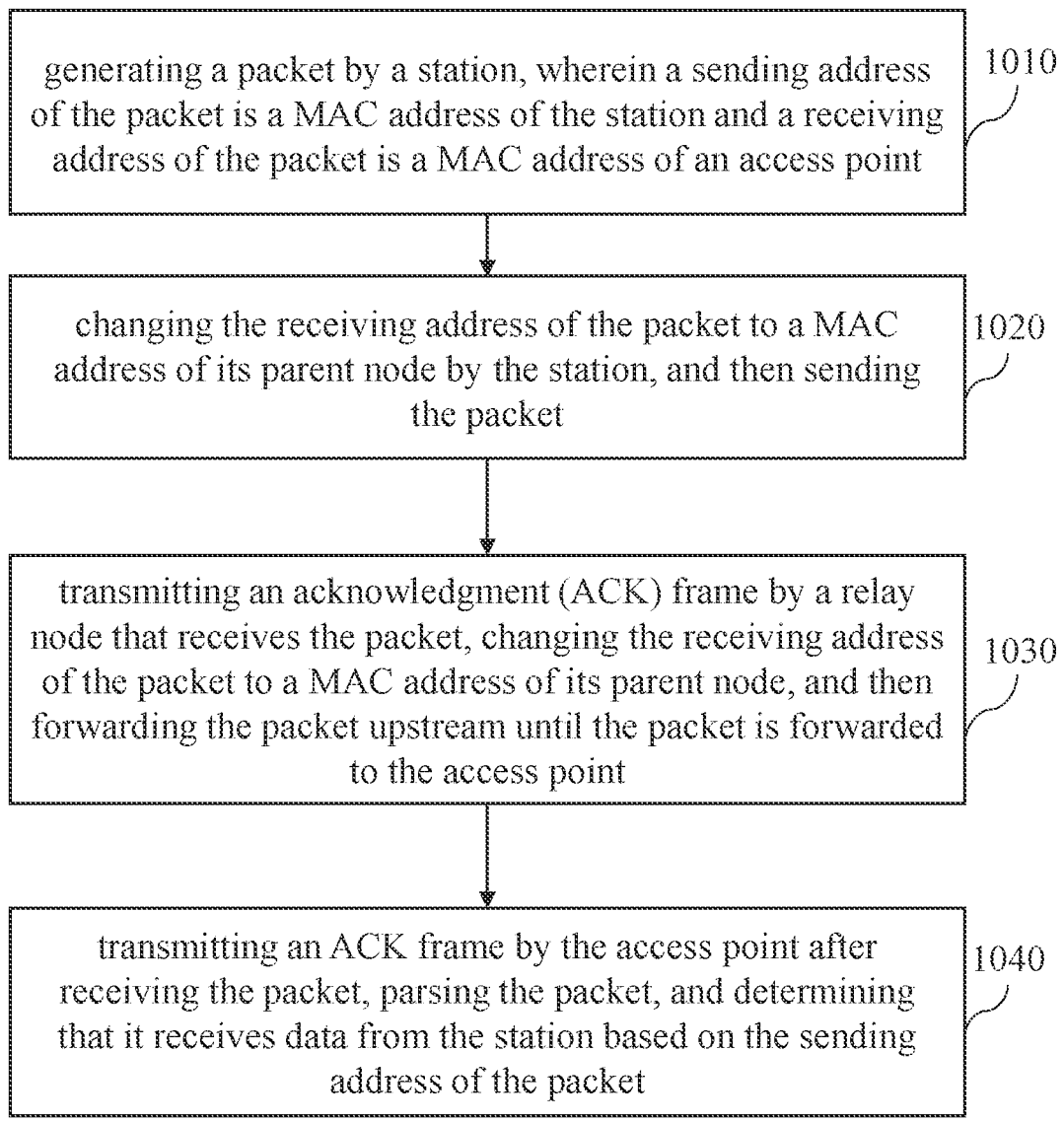
FIG. 14 is a flowchart of a data transmission method according to a first embodiment of the present disclosure.

Please refer to FIG. 14, which is a flowchart of a data transmission method according to a first embodiment of the present disclosure. The data transmission method comprises: generating a packet by a station, wherein a sending address of the packet is a MAC address of the station and a receiving address of the packet is a MAC address of an access point (step 1010); changing the receiving address of the packet to a MAC address of its parent node by the station, and then sending the packet (step 1020); transmitting an acknowledgment (ACK) frame by a relay node that receives the packet, changing the receiving address of the packet to a MAC address of its parent node, and then forwarding the packet upstream until the packet is forwarded to the access point (step 1030); and transmitting an ACK frame by the access point after receiving the packet, parsing the packet, and determining that it receives data from the station based on the sending address of the packet (step 1040).

Generally, network integrated circuits (ICs) mainly process data in a physical layer (i.e., Layer 1) and a data link layer (i.e., Layer 2) with hardware, and process data in above Layer 3 with software. However, with the increasing demand for bandwidth, the requirements for the transmission rate of routers have also increased significantly. Therefore, it is also possible to choose to process the data of the third layer by hardware for the network ICs. In this embodiment, the station can include a software layer and a hardware layer, so in step 1010, the station can generate a packet by the software layer, and in step 1020, the station can change the receiving address of the packet to the MAC address of its parent node by the hardware layer, and then send the packet. In another embodiment, the station can change the receiving address of the packet to the MAC address of its parent node by the software layer, and then send the packet.

In one embodiment, the format of the packet generated by the software layer of the station may use a frame defined by the 802.11 protocol, such as a data frame, a management frame, a control frame, and other self-defined frames.

In one embodiment, the format of the packet generated by the software layer of the station may be a data frame defined by the 802.11 protocol, and the data frame comprises a frame control field, a duration field, an address 1 field, an address 2 field, an address 3 field, a sequence control field, an address 4 field, a quality of service (QoS) control field, a high throughput (HT) control field, a frame body field, and a frame check sequence (FCS) field, as shown in FIG. 15, which is a schematic diagram of a format of a packet generated by a station according to an embodiment of the present disclosure. Specifically, the software layer of the station fills the address 1 field in the data frame with the MAC address of the access point, and fills the address 2 field with the MAC address of itself to generate the packet, but this embodiment is not intended to limit the present disclosure.

In one embodiment, in order to consider the security of data transmission, the data transmission method may be further performed by encrypting the packet at the station, and decrypting the packet at the access point. Specifically, when the encryption and decryption method is performed by using the Temporal Key Integrity Protocol (TKIP), the Counter Mode Cipher Block Chaining Message Authentication Protocol (CCMP) or the Wired Equivalent Privacy Protocol (WEP), step 1010 may comprise: generating the packet by the software layer of the station, and then encrypting the packet, or step 1020 may comprise: changing, by the hardware layer of the station, the receiving address of the packet to the MAC address of its parent node after the hardware layer of the station encrypts the packet, and then sending the packet; step 1040 may comprise: decrypting, by the access point, the packet received, and then determining that it receives the data from the station based on the sending address of the packet being the MAC address of the station. In an example, the station may encrypt the packet by the software layer or the hardware layer, then change the receiving address of the packet to the MAC address of its parent node, and then send the packet.

In another embodiment, when the encryption and decryption method is performed by using the TKIP or WEP, step 1020 may comprise: encrypting, by the station, the packet after the hardware layer of the station changes the receiving address of the packet to the MAC address of its parent node, and then sending the packet; step 1040 may comprise: decrypting, by the access point, the packet received, and then determining that it receive the data from the station based on the sending address of the packet being the MAC address of the station.

In one embodiment, in order to ensure the correctness and integrity of data transmission, the data transmission method may use a cyclic redundancy check (CRC) algorithm to check the packet. Specifically, step 1020 may comprise: performing, by the station, CRC calculation on the packet, and fill a calculated CRC code into the packet after the hardware layer of the station changes the receiving address of the packet to the MAC address of its parent node, and then sending the packet; step 1030 may comprise: performing, by the relay node receiving the packet, CRC check on the packet, returning an ACK frame when the packet passes the CRC check, changing the receiving address of the packet received to the MAC address of its parent node, performing CRC calculation on the packet, filling a calculated CRC code into the packet, and then forwarding the packet upstream until the packet is forwarded to the access point; step 1040 may comprise: performing, by the access point, CRC check on the packet after the access point receives the packet, returning an ACK frame when the packet passes the CRC check, and then parsing the packet to obtain the data from the station.

In another embodiment where the CRC check algorithm is used to check the packet, step 1020 may comprise: performing, by the station, CRC calculation on the packet, filling a calculated CRC code into the packet, changing the receiving address of the packet to the MAC address of its parent node, and then sending the packet; step 1030 may comprise: changing, by the relay node receiving the packet, the receiving address of the packet to the MAC address of the access point, performing CRC check on the packet, returning an ACK frame when the packet passes the CRC check, changing the receiving address of the packet to the MAC address of its parent node (the packet retains the original CRC code), and then forwarding the packet upstream until the packet is forwarded to the access point; step 1040 may comprise: performing, by the access point, CRC check on the packet after the access point receives the packet, returning an ACK frame when the packet passes the CRC check, and then parsing the packet to obtain the data from the station.

In one embodiment, in order to consider the security, correctness and integrity of data transmission at the same time, the data transmission method may comprise the encryption and decryption of the data field of the packet and the check of the packet by using the CRC algorithm.

Figure 16:
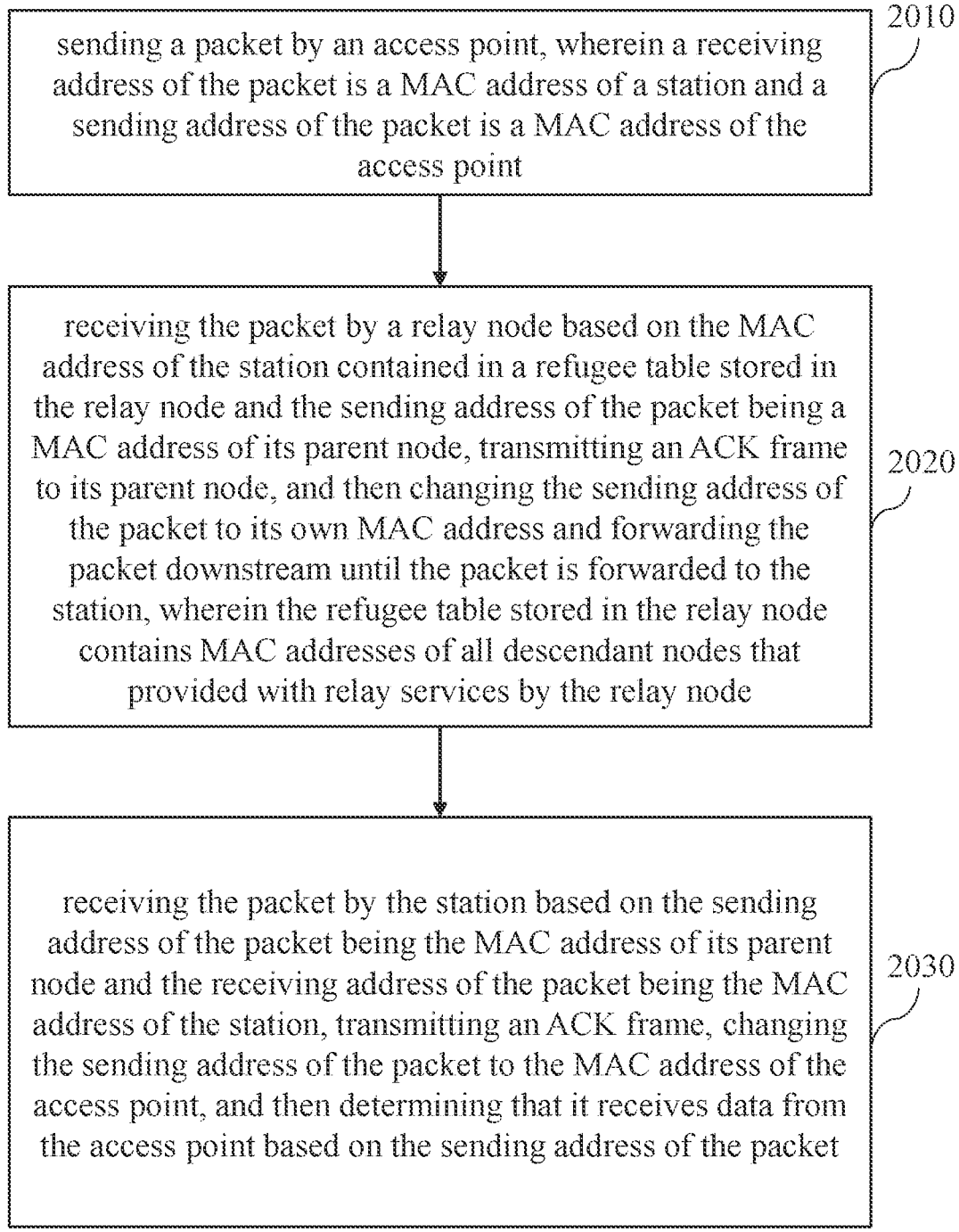
FIG. 16 is a flowchart of a data transmission method according to a second embodiment of the present disclosure.

Please refer to FIG. 16, which is a flowchart of a data transmission method according to a second embodiment of the present disclosure. The data transmission method comprises: sending a packet by an access point, wherein a receiving address of the packet is a MAC address of a station and a sending address of the packet is a MAC address of the access point (step 2010); receiving the packet by a relay node based on the MAC address of the station contained in a refugee table stored by itself and the sending address of the packet being a MAC address of its parent node, transmitting an ACK frame to its parent node, and then changing the sending address of the packet to a MAC address of itself and forwarding the packet downstream until the packet is forwarded to the station, wherein the refugee table stored in the relay node contains MAC addresses of all descendant nodes that provided with relay services by the relay node (step 2020); and receiving the packet by the station based on the sending address of the packet being the MAC address of its parent node and the receiving address of the packet being the MAC address of the station, transmitting an ACK frame, changing the sending address of the packet to the MAC address of the access point, and then determining that it receives data from the access point based on the sending address of the packet (step 2030).

In one embodiment, the format of the packet sent by the access point may be a data frame defined by the 802.11 protocol, such as a management frame, a control frame, and other self-defined frames.

In one embodiment, the station may include a hardware layer and a software layer, so in step 2030, the station may receive the packet by the hardware layer, transmit the ACK frame, and change the sending address of the received packet to the MAC address of the access point and then transmit the packet to the software layer, and the software layer of the station may determines to receive data from the access point based on the sending address of the packet.

In one embodiment, the format of the packet sent by the access point may be a data frame defined by the 802.11 protocol as shown in FIG. 15. Specifically, the access point fills the address 1 field in the data frame with the MAC address of the station, and fills the address 2 field with the MAC address of itself to generate the packet, but this embodiment is not intended to limit the present disclosure. For example, the access point fills the address 3 field in the data frame with the MAC address of the station, and fills the address 4 field with the MAC address of itself to generate the packet (that is, the address 3 field is filled with the receiving address, and the address 4 field is filled with the sending address).

In one embodiment, in order to consider the security of data transmission, the data transmission method may be further performed by encrypting the packet at the access point, and decrypting the packet at the station. Specifically, step 2010 may comprise: encrypting, by the access point, the packet, and then sending the packet; step 2030 may comprise: changing, by the station, the sending address of the packet to the MAC address of the access point after the station decrypts the packet, and then determining that it receives the data from the access point based on the sending address of the packet. In another embodiment, step 2010 may comprise: encrypting, by the access point, the packet and then sending the packet; step 2030 may comprise: changing, by t the station, the sending address of the received packet to the MAC address of the access point; and decrypting, by the station, the packet, and determining that it receive the data from the access point based on the sending address of the packet.

In one embodiment, in order to ensure the correctness and integrity of data transmission, the data transmission method may use the CRC algorithm to check the packet. Specifically, step 2010 may comprise: performing, by the access point, CRC calculation on the packet, filling a calculated CRC code into the packet, and then sending the packet; step 2020 may comprise: performing, by the relay node receiving the packet, CRC check on the packet, returning an ACK frame when the packet passes the CRC check, changing the sending address of the packet to the MAC address of itself, performing CRC calculation on the packet, filling a calculated CRC code into the packet, and then forwarding the packet downstream; step 2030 may comprise: performing, by the station, CRC check on the packet, returning an ACK frame when the packet passes the CRC check, changing the sending address of the packet to the MAC address of the access point, and then determining that it receives the data from the access point based on the sending address of the packet. In an example of step 2030, the station can perform the CRC check on the packet by the hardware layer, return the ACK frame when the packet passes the CRC check, and change the sending address of the received packet to the MAC address of the access point by the hardware layer or the software layer, and the software layer of the station determines to receive data from the access point based on the sending address of the packet.

In another embodiment where the CRC check algorithm is used to check the packet, step 2010 may comprise: performing, by the access point, CRC calculation on the packet, filling a calculated CRC code into the packet, and then sends the packet; step 2020 may comprise: performing, by the relay node receiving the packet, CRC check on the packet, returning an ACK frame when the packet passes the CRC check, changing the sending address of the packet to the MAC address of itself (the packet retains the original CRC code) and then forwarding the packet downstream; step 2030 may comprise: changing, by the station, the sending address of the packet to the MAC address of the access point, performing CRC check on the packet, returning an ACK frame when the packet passes the CRC check, and then determining that it receives the data from the access point based on the sending address of the packet that passes the CRC check.

In one embodiment, in order to consider the security, correctness and integrity of data transmission at the same time, the data transmission method may comprise the encryption and decryption of the data field of the packet and the check of the packet by using the CRC algorithm.

Figure 17:
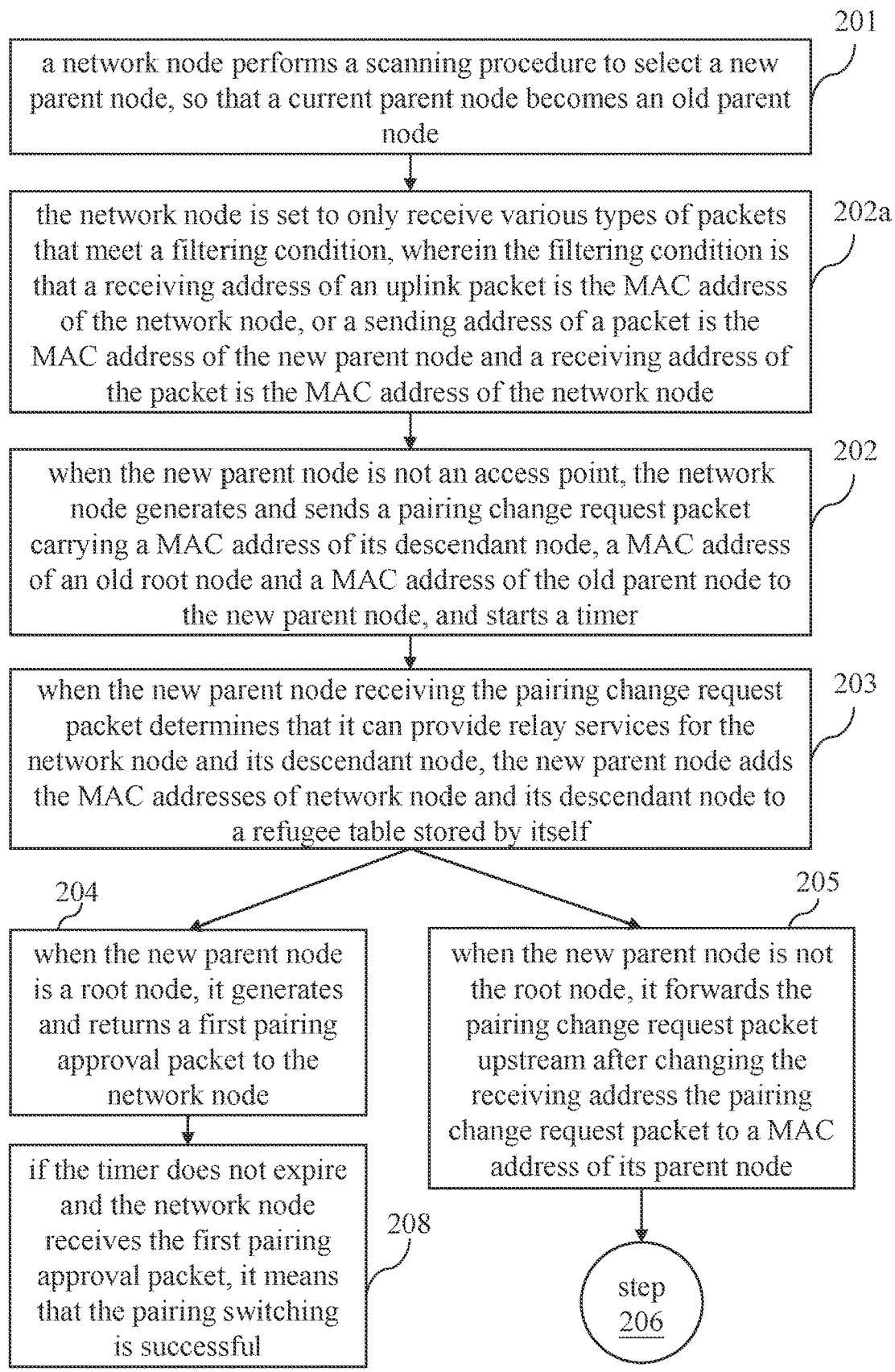
FIG. 17 and FIG. 18 are a flowchart of a method for switching pairing in a mesh network system according to a first embodiment of the present disclosure.
Figure 18:
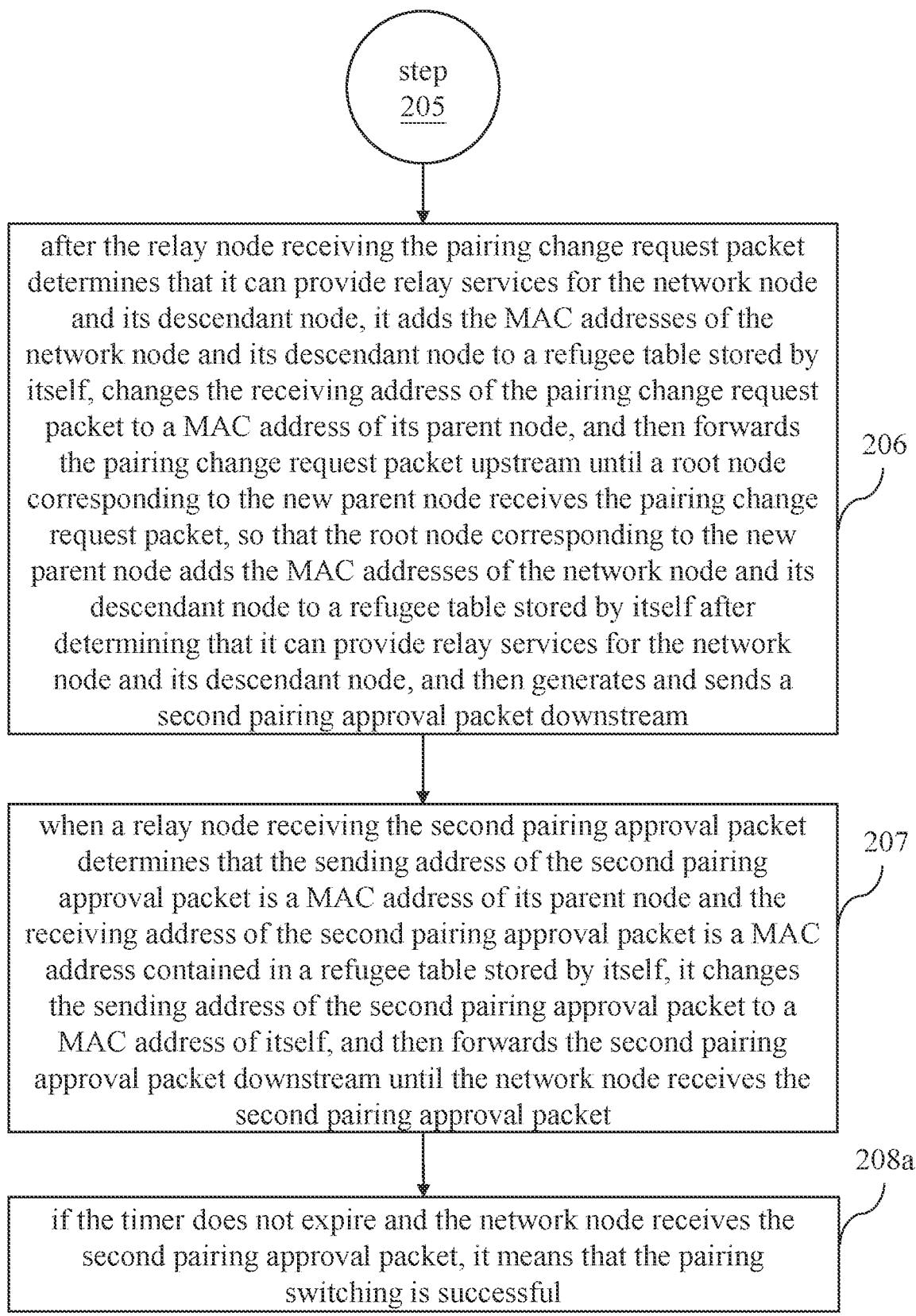

Please refer to FIG. 17 and FIG. 18, which are a flowchart of a method for switching pairing in a mesh network system according to a first embodiment of the present disclosure. As shown in FIG. 17 and FIG. 18, the method for switching pairing in the mesh network system comprises step 201 to step 205 and step 208.

In step 201, a network node performs a scanning procedure to select a new parent node, so that a current parent node becomes an old parent node.

In one embodiment, when the network node detects that the communication quality with the current parent node is poor or receives a first pairing cancellation packet from the current parent node, it performs the scanning procedure to select the new parent node, so that the current parent node becomes the old parent node, wherein the format of the first pairing cancellation packet can be a frame defined by the 802.11 protocol, such as a data frame, a management frame, a control frame, and other self-defined frames. In an example, the current parent node fills an address 1 field in a null data frame with the MAC address of the network node, fills an address 2 field in the null data frame with the MAC address of the current parent node, sets a first preset bit of an address 3 field in the null data frame to a first preset value to define the null data frame as a handshake frame, and sets a plurality of second preset bits of the address 3 field in the null data frame to a fifth preset value to define a type of the handshake frame as pairing cancellation, so as to generate the first pairing cancellation packet.

In an example, when the network node counts that an uplink packet transmission failure rate reaches a first threshold, energy of a packet received from the current parent node is lower than a second threshold, or a beacon is continuously lost for a period of time, it represents that the network node detects that the communication quality with the current parent node is poor, so that the network node performs the scanning procedure to select the new parent node, wherein the first threshold and the second threshold can be set according to actual needs.

In an example, when the current parent node detects that the communication quality with the network node is poor, receives a request from the application layer to disconnect the current network connection, or needs to connect to other networks, it sends the first pairing cancellation packet to the network node, so that the network node performs the scanning procedure to select the new parent node, but this example is not intended to limit the present disclosure.

In one embodiment, the manner in which the network node performs the scanning procedure to select the new parent node may be the same as the manner in which the node to be paired performs the scanning procedure to select the parent node described in FIG. 13, and details will not be repeated here. In another embodiment, step 201 of performing, by the network node, the scanning procedure to select the new parent node, so that the current parent node becomes the old parent node further comprises: obtaining, by the network node, communication information of each relay node in the mesh network system based on a plurality of beacon packets or a plurality of probe response packets obtained through the scanning procedure; and selecting, by the network node, a relay node as the new parent node based on the communication information of each relay node. The communication information of each relay node comprises a signal strength between each relay node and the access point, a signal strength between the network node and each relay node, a level of each relay node in the mesh network system, relay service capability of each relay node, and/or a MAC address of each relay node, wherein the relay service capability of each relay node allows the network node to determine how many subordinate nodes each relay node can provide relay services for, and the MAC address of each relay node allows the network node to confirm whether the MAC address of each relay node is contained in the refugee table stored by itself.

In step 202, when the new parent node is not an access point, the network node generates and sends a pairing change request packet carrying a MAC address of its descendant node, a MAC address of an old root node and a MAC address of the old parent node to the new parent node, and starts a timer, wherein the pairing change request packet selectively carries the MAC address of the new parent node.

The old root node is a root node corresponding to the old parent node; a sending address of the pairing change request packet is the MAC address of network node, and a receiving address of the pairing change request packet is the MAC address of new parent node; and the format of the pairing change request packet can be a frame defined by the 802.11 protocol, such as a data frame, a management frame, a control frame, and other self-defined frames. In one embodiment, the format of the pairing change request packet can expand a payload field on the basis of a pairing request packet. Specifically, the step 202 of generating and sending, by the network node, the pairing change request packet carrying the MAC address of its descendant node, the MAC address of the old root node, and the MAC address of the old parent node to the new parent node further comprises: filling, by the network node, an address 1 field in a null data frame with the MAC address of the new parent node, filling an address 2 field in the null data frame with the MAC address of the network node, setting a first preset bit of an address 3 field in the null data frame to a first preset value to define the null data frame as a handshake frame, setting a plurality of second preset bits of the address 3 field in the null data frame to a third preset value to define a type of the handshake frame as a pairing request, and filling an payload field in the null data frame, which is expanded, with the MAC address of the descendant node of the network node, the MAC address of the old root node, and the MAC address of the old parent node, so as to generate and send the pairing change request packet to the new parent node, wherein the expanded payload field in the pairing change request packet may carry the MAC address of the new parent node.

In an example, the first preset bit of the address 3 field may be bit0, the first preset value may be 1 (that is, bit0 is 1), the plurality of second preset bits of the address 3 field may be bit1 to bit4, the third preset value may be 0 (that is, bit1 to bit4 are all 0), other bits of the address 3 field (that is, bit5 to bit47) may be reserved for encoding, and the expanded payload field is sequentially filled with the MAC address of the descendant node of the network node, the MAC address of the old root node, and the MAC address of the old parent node.

In step 203, when the new parent node receiving the pairing change request packet determines that it can provide relay services for the network node and its descendant node, the new parent node adds the MAC addresses of network node and its descendant node to a refugee table stored by itself.

In step 204, when the new parent node is a root node, it generates and returns a first pairing approval packet to the network node, wherein a sending address of the first pairing approval packet is the MAC address of the new parent node, and a receiving address of the first pairing approval packet is the MAC address of the network node. The format of the first pairing approval packet can be a frame defined by the 802.11 protocol, such as a data frame, a management frame, a control frame, and other self-defined frames. In an embodiment, the step 204 of generating and returning, by the new parent node, the first pairing approval packet to the network node when the new parent node is the root node further comprises: filling, by the new parent node, an address 1 field in a null data frame with the MAC address of the network node, filling an address 2 field in the null data frame with the MAC address of the new parent node, setting a first preset bit of an address 3 field in the null data frame to a first preset value to define the null data frame as a handshake frame, and setting a plurality of second preset bits of the address 3 field in the null data frame to a fourth preset value to define a type of the handshake frame as pairing approval, so as to generate and return the first pairing approval packet.

In step 205, when the new parent node is not the root node, it forwards the pairing change request packet upstream after changing the receiving address the pairing change request packet to a MAC address of its parent node.

In step 208, if the timer does not expire and the network node receives the first pairing approval packet, it means that the pairing switching is successful.

In an embodiment, when the new parent node is not the root node, after the step 205, the method for switching pairing in the mesh network system may further comprise: step 206, step 207 and step 208*a*.

In step 206, after the relay node receiving the pairing change request packet determines that it can provide relay services for the network node and its descendant node, it adds the MAC addresses of the network node and its descendant node to a refugee table stored by itself, changes the receiving address of the pairing change request packet to a MAC address of its parent node, and then forwards the pairing change request packet upstream until a root node corresponding to the new parent node receives the pairing change request packet, so that the root node corresponding to the new parent node adds the MAC addresses of the network node and its descendant node to a refugee table stored by itself after determining that it can provide relay services for the network node and its descendant node, and then generates and sends a second pairing approval packet downstream. A sending address of the second pairing approval packet is a MAC address of the root node corresponding to the new parent node, and a receiving address of the second pairing approval packet is the MAC address of the network node. The format of the second pairing approval packet can be a frame defined by the 802.11 protocol, such as a data frame, a management frame, a control frame, and other self-defined frames. In an embodiment, the step 206 of generating and sending, by the root node corresponding to the new parent node, the second pairing approval packet downstream comprises: filling, by the root node corresponding to the new parent node, an address 1 field in a null data frame with the MAC address of the network node, filling an address 2 field in the null data frame with the MAC address of the root node corresponding to the new parent node, setting a first preset bit of an address 3 field in the null data frame to a first preset value to define the null data frame as a handshake frame, and setting a plurality of second preset bits of the address 3 field in the null data frame to a fourth preset value to define a type of the handshake frame as pairing approval, so as to generate and send the second pairing approval packet.

In step 207, when a relay node receiving the second pairing approval packet determines that the sending address of the second pairing approval packet is a MAC address of its parent node and the receiving address of the second pairing approval packet is a MAC address contained in a refugee table stored by itself, it changes the sending address of the second pairing approval packet to a MAC address of itself, and then forwards the second pairing approval packet downstream until the network node receives the second pairing approval packet.

In step 208*a*, if the timer does not expire and the network node receives the second pairing approval packet, it means that the pairing switching is successful.

In one embodiment, after the above-mentioned step 201, the method for switching pairing in the mesh network system may further comprise step 202*a*. In step 202*a*, the network node is set to only receive various types of packets that meet a filtering condition, wherein the filtering condition is that a receiving address of an uplink packet is the MAC address of the network node, or a sending address of a packet is the MAC address of the new parent node and a receiving address of the packet is the MAC address of the network node.

In one embodiment, in addition to the above step 201 to step 208 and step 208*a*, the method for switching pairing in the mesh network system may further comprise: if the timer expires, it means that the pairing switching fails. Specifically, if the timer expires and the network node does not receive the first pairing approval packet or the second pairing approval packet, it means that the pairing switching fails.

In one embodiment, in addition to the above step 201 to step 208 and step 208*a*, the method for switching pairing in the mesh network system may further comprise: generating and returning, by the new parent node receiving the pairing change request packet, a pairing rejection packet to the network node when determining that it cannot provide relay services for the network node and its descendant node, wherein a sending address of the pairing rejection packet is a MAC address of itself (that is, the MAC address of the new parent node), and a receiving address of the pairing rejection packet is the MAC address of the network node; and the pairing switching failing when the network node receives the pairing rejection packet.

In one embodiment, in addition to the above step 201 to step 208 and step 208*a*, the method for switching pairing in the mesh network system may further comprise: generating and sending, by any one relay node receiving the pairing change request packet or the root node corresponding to the new parent node, a pairing rejection packet when determining that it cannot provide relay services for the network node and its descendant node; and the pairing switching failing when the network node receives the pairing rejection packet. A sending address of the pairing rejection packet is a MAC address of itself, a receiving address of the pairing rejection packet is the MAC address of the network node, and the pairing rejection packet carries the MAC addresses of the network node and its descendant node. The relay node receiving the pairing rejection packet deletes the MAC addresses of the network node and its descendant node from the refugee table stored by itself, changes the sending address of the pairing rejection packet to a MAC address of itself, and then forwarding the pairing rejection packet downstream until the network node receives the pairing rejection packet.

Figure 19:
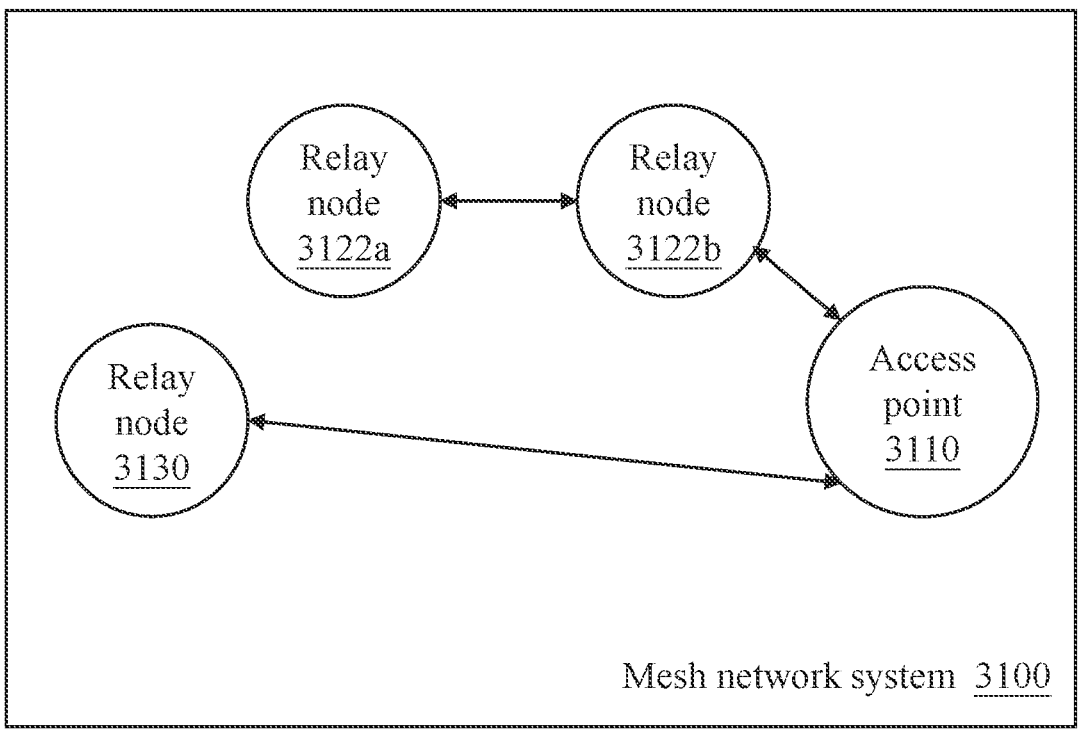
FIG. 19 and FIG. 20 are schematic diagrams of an embodiment of the mesh network system before and after applying the method for switching pairing in FIG. 17 and FIG. 18.
Figure 20:
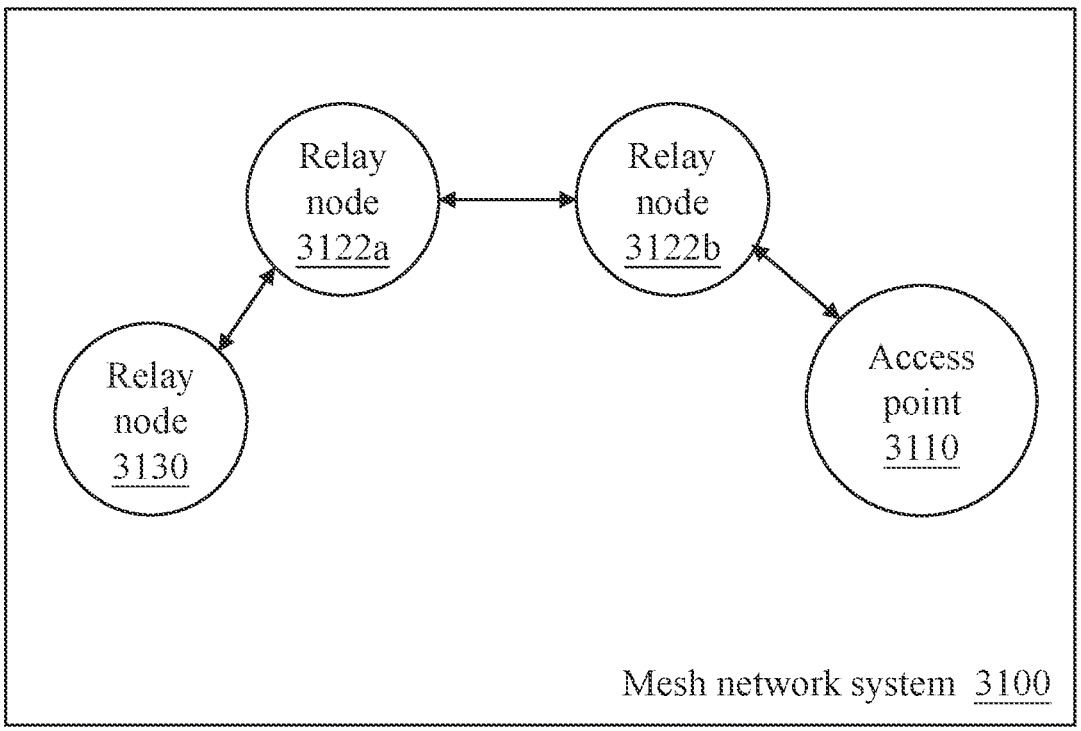

Please refer to FIG. 19 and FIG. 20, which are schematic diagrams of an embodiment of the mesh network system before and after applying the method for switching pairing in FIG. 17 and FIG. 18. The mesh network system 3100 comprises an access point 3110 and a plurality of network nodes, the plurality of network nodes can communicate with each other through the mesh network, and the plurality of network nodes comprises a plurality of relay nodes (that is, a relay nodes 3122a, a relay node 3122b and a relay node 3130), the relay node 3122b and the relay node 3130 serve as the root nodes communicating with the access point 3110, and the parent node of the relay node 3122a is the relay node 3122b. In the process of constructing the mesh network system 3100 based on the above method for pairing nodes, each of the relay node 3122a, the relay node 3122b and the relay node 3130 stores the MAC address(es) of its descendant node(s) in the refugee table stored by itself.

In FIG. 19, the parent node of the relay node 3130 is the access point 3110. In FIG. 20, the parent node of the relay node 3130 is changed to the relay node 3122a. The whole process of changing the parent node of the relay node 3130 from the access point 3110 to the relay node 3122a is as follows.

When the relay node 3130 detects that the communication quality with the access point 3110 is poor, it performs a scanning procedure to select the relay node 3122a, so that the access point 3110 becomes the old parent node.

The relay node 3130 is set to only receive an uplink packet whose receiving address is a MAC address of itself (that is, the MAC address of the relay node 3130), or a packet with a sending address being the MAC address of the relay node 3122a and a receiving address being a MAC address of itself (that is, the MAC address of the relay node 3130).

Since the relay node 3122a (i.e., the new parent node) is not an access point, the relay node 3130 generates and sends a pairing change request packet carrying the MAC address of its descendant node, the MAC address of the relay node 3130, and the MAC address of the access point 3110 to the relay node 3122a, and starts a timer, wherein the sending address of the pairing change request packet is the MAC address of the relay node 3130, and the receiving address of the pairing change request packet is the MAC address of the relay node 3122a. It should be noted that, since the relay node 3130 is changed from a root node to a non-root node during pairing switching, the relay node 3130 becomes the old root node when pairing is switched.

After the relay node 3122a receives the pairing change request packet, it first determines whether it can provide the relay services for the relay node 3130 and its descendant node. When the relay node 3122a determines that it can provide the relay services for the relay node 3130 and its descendant node, it adds the MAC addresses of the relay node 3130 and its descendant node to the refugee table stored by itself, and then determines that it is not a root node. Therefore, the relay node 3122a changes the receiving address of the received pairing change request packet from the MAC address of the relay node 3122a to the MAC address of its parent node, and then forwards the pairing change request packet upstream.

After the relay node 3122b receives the pairing change request packet, it first determines whether it can provide the relay services for the relay node 3130 and its descendant node. When the relay node 3122b determines that it can provide the relay services for the relay node 3130 and its descendant node, it adds the MAC addresses of the relay node 3130 and its descendant node to the refugee table stored by itself, and then generates and sends a second pairing approval packet downstream since the relay node 3122b is a root node, wherein a sending address of the second pairing approval packet is the MAC address of the relay node 3122b, and a receiving address of the second pairing approval packet is the MAC address of the relay node 3130.

After receiving the second pairing approval packet, the relay node 3122a first determines that the sending address of the second pairing approval packet is the MAC address of its parent node and the receiving address of the second pairing approval packet is the MAC address contained in the refugee table stored by itself, and then changes the sending address of the received second pairing approval packet from the MAC address of the relay node 3122b to the MAC address of the relay node 3122a, and finally forwards the changed second pairing approval packet to the relay node 3130 downstream.

When the timer does not expire and the relay node 3130 receives the second pairing approval packet, it means that the relay node 3130 has successfully paired with the relay node 3122a.

Please refer to FIG. 21, which is a flow chart of a method for switching pairing in a mesh network system according to a second embodiment of the present disclosure. In addition to step 201 to step 208 and step 208a in FIG. 17 and FIG. 18, the method for switching pairing in the mesh network system may further comprise: step 210 to step 213. It should be noted that, in order to avoid the drawing in FIG. 21 being too complicated, step 201 to step 208 and step 208a are omitted to be drawn.

In step 210, when the root node corresponding to the new parent node is not the same as the root node corresponding to the old parent node, the root node corresponding to the new parent node further generates and sends a pairing switching packet carrying a pairing switch identifier, the MAC addresses of the network node and its descendant node, and a MAC address of the old parent node to the access point, so that the access point forwards the pairing switching packet to the old root node. A receiving address of the pairing switching packet is the MAC address of the access point, a sending address of the pairing switching packet is a MAC address of itself (that is, the MAC address of the root node corresponding to the new parent node), and a destination address of the pairing switching packet is the MAC address of the old root node. The pairing switching packet can be but not limited to a normal packet defined by the 802.11 protocol or a QoS packet. The pairing switching packet may comprise: an address 1 field, an address 2 field, an address 3 field, and a payload field.

In one embodiment, the step 210 of generating and sending, by the root node corresponding to the new parent node, the pairing switching packet carrying the pairing switch identifier, the MAC addresses of the network node and its descendant node, and the MAC address of the old parent node to the access point further comprises: filling, by the root node corresponding to the new parent node, an address 1 field in a data frame with the MAC address of the access point, filling an address 2 field in the data frame with the MAC address of the root node corresponding to the new parent node (that is, the MAC address of itself), filling an address 3 field in the data frame with the MAC address of the old root node, and filling a payload field in the data frame with the pairing switch identifier, the MAC addresses of the network node and its descendant node, and the MAC address of the old parent node, so as to generate and send the pairing switching packet to the access point.

In one embodiment, after the network node confirms that the pairing switching is successful (that is, step 208 or step 208*a*), it additionally notifies the new root node to perform step 210. In another embodiment, no matter whether the pairing switching is successful or not, the root node corresponding to the new parent node may generate and send the pairing switching packet to the access point while or after generating and sending the second pairing approval packet downstream.

In step 211, after the old root node receives the pairing switching packet, it deletes the MAC addresses of the network node and its descendant node from a refugee table stored by itself, and generates and sends a second pairing cancellation packet carrying the MAC addresses of the network node and its descendant node downstream, wherein a receiving address of the second pairing cancellation packet is the MAC address of the old parent node, a sending address of the second pairing cancellation packet is the MAC address of the old root node, and the format of the second pairing cancellation packet can be a frame defined by the 802.11 protocol, such as a data frame, a management frame, a control frame, and other self-defined frames.

In one embodiment, the format of the second pairing cancellation packet can expand a payload field on the basis of a null data frame, so that the step 211 of generating and sending, by the old root node, the second pairing cancellation packet carrying the MAC addresses of the network node and its descendant node downstream comprise: filling, by the old root node, an address 1 field in a null data frame with the MAC address of the old parent node, filling an address 2 field in the null data frame with the MAC address of the old root node, setting a first preset bit of an address 3 field in the null data frame to a first preset value to define the null data frame as a handshake frame, setting a plurality of second preset bits of the address 3 field in the null data frame to a fifth preset value to define a type of the handshake frame as a pairing cancellation, and filling a payload field in the null data frame, which is expanded, with the MAC addresses of the network node and its descendant node, so as to generate and send the second pairing cancellation packet downstream. In an example, the first preset bit of the address 3 field may be bit0, the first preset value may be 1 (that is, bit0 is 1), the plurality of second preset bits of the address 3 field may be bit1 to bit4, and the fifth preset value may be 3 (that is, bit3 and bit4 are 1, and bit1 and bit2 are 0).

In step 212, the relay node that receives the second pairing cancellation packet deletes the MAC addresses of the network node and its descendant node from a refugee table stored by itself, changes the sending address of the second pairing cancellation packet to the MAC address of itself, and then forwards the second pairing cancellation packet downstream until the old parent node receives the second pairing cancellation packet.

In step 213, after receiving the second pairing cancellation packet, the old parent node deletes the MAC addresses of the network node and its descendant node from a refugee table stored by itself.

Therefore, the old parent node and its upper-level node(s) can delete the MAC addresses of the network node and its descendant node from the refugee table stored by itself in the process of pairing switching. That is, the old parent node and its upper-level node(s) do not provide relay services for the network node and its descendant node(s).

Figure 22:
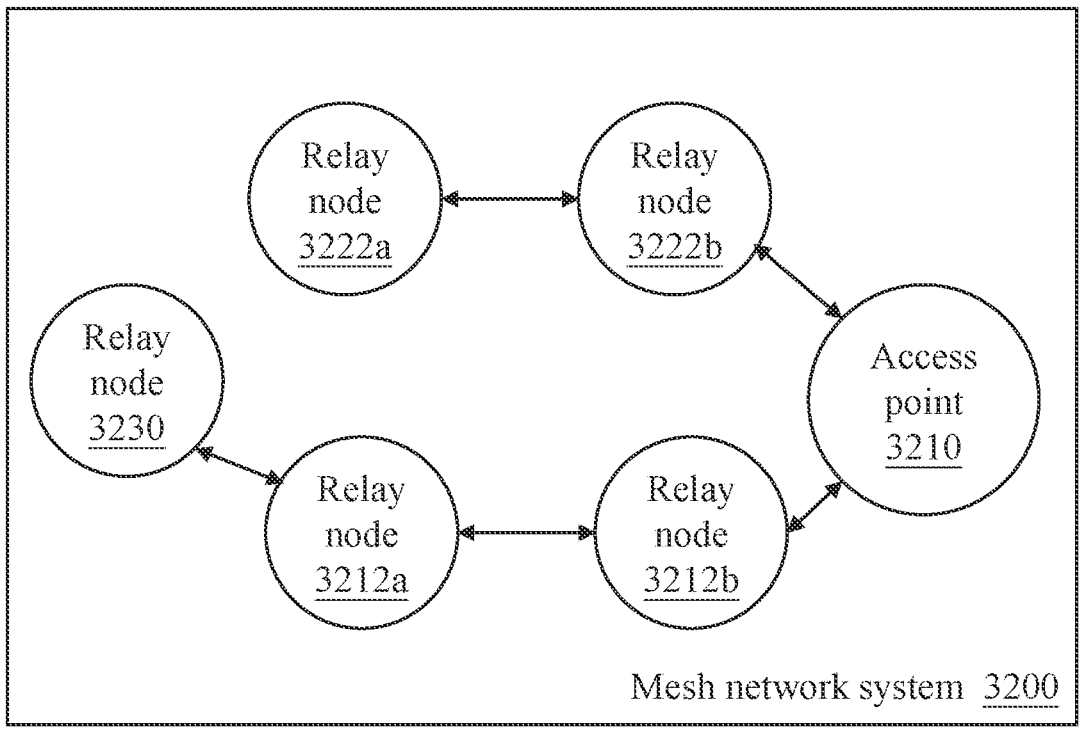
FIG. 22 and FIG. 23 are schematic diagrams of an embodiment of the mesh network system before and after applying the method for switching pairing in FIG. 21.
Figure 23:
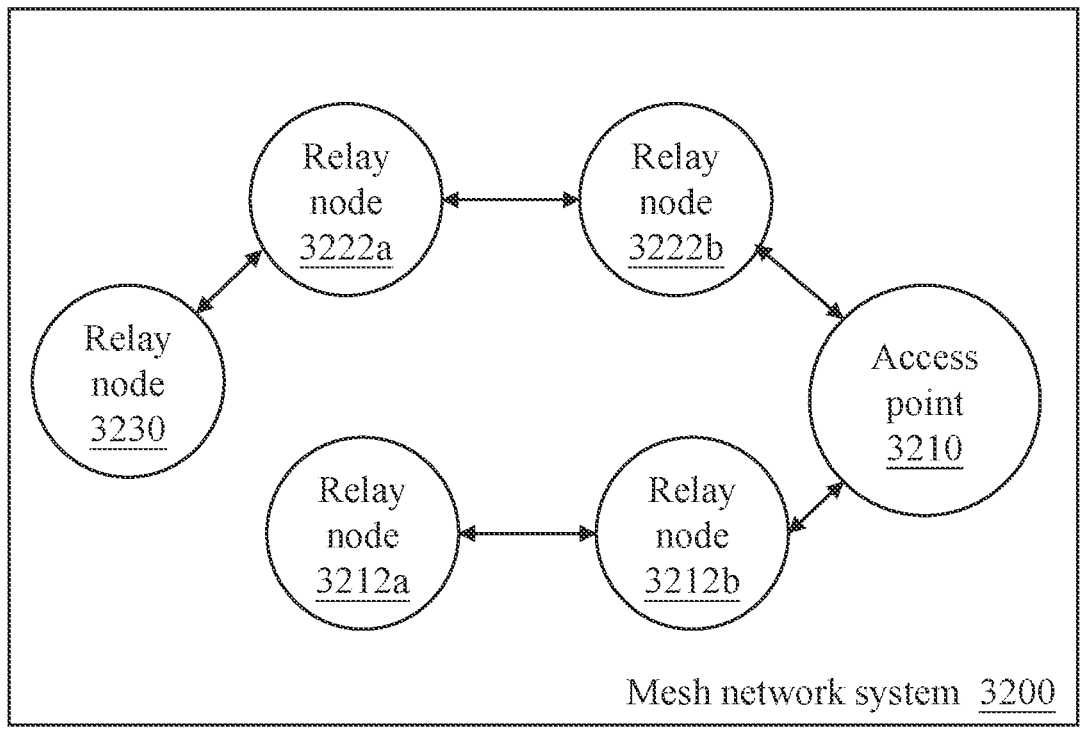

Please refer to FIG. 22 and FIG. 23, which are schematic diagrams of an embodiment of the mesh network system before and after applying the method for switching pairing in FIG. 21. The mesh network system 3200 comprises an access point 3210 and a plurality of network nodes, the plurality of network nodes can communicate with each other through the mesh network, and the plurality of network nodes comprise a plurality of relay nodes (i.e., a relay nodes 3212*a*, a relay node 3212*b*, a relay node 3222*a*, a relay node 3222*b* and a relay node 3230). The relay node 3222*b* and the relay node 3212*b* serve as the root nodes communicating with the access point 3210, and the parent node of the relay node 3212*a* is the relay node 3212*b*, the parent node of the relay node 3222*a* is the relay node 3222*b*. In the process of constructing the mesh network system 3200 based on the above-mentioned method for pairing nodes, each of the relay node 3212*a*, the relay node 3212*b*, the relay node 3222*a*, the relay node 3222*b*, and the relay node 3230 stores the MAC address(es) of its descendant node(s) in its refugee table.

In FIG. 22, the parent node of the relay node 3230 is the relay node 3212*a*. In FIG. 23, the parent node of the relay node 3130 is changed to the relay node 3222*a*. The whole process of changing the parent node of the relay node 3230 from the relay node 3212*a* to the relay node 3222*a* is as follows.

When the relay node 3230 detects that the communication quality with the relay node 3212*a* is poor or receives a first pairing cancellation packet from the relay node 3212*a*, it performs the scanning procedure to select the relay node 3222*a*, so that the relay node 3212*a* becomes the old parent node.

The relay node 3230 is set to only receive an uplink packet whose receiving address is the MAC address of itself (that is, the MAC address of the relay node 3230), or a packet with a sending address being the MAC address of the relay node 3222*a* and a receiving address being the MAC address of itself (that is, the MAC address of the relay node 3230).

Since the relay node 3222*a* is not an access point, the relay node 3230 generates and sends a pairing change request packet carrying a MAC address of its descendant node, the MAC address of the relay node 3230, the MAC address of the relay node 3212*a*, and the MAC address of the relay node 3222*a* to the relay node 3222*a*, and starts a timer, wherein a sending address of the pairing change request packet is the MAC address of the relay node 3230 and a receiving address of the pairing change request packet is the MAC address of the relay node 3222*a*.

After the relay node 3222*a* receives the pairing change request packet, it first determines whether it can provide relay services for the relay node 3230 and its descendant node. When the relay node 3222*a* determines that it can provide relay services for the relay node 3230 and its descendant node, it adds the MAC addresses of the relay node 3230 and its descendant node to the refugee table stored by itself, and then determines that it is not a root node. Therefore, the relay node 3222*a* changes the receiving address of the received pairing change request packet from the MAC address of the relay node 3222*a* to the MAC address of its parent node, and then forwards the changed pairing change request packet upstream.

After the relay node 3222*b* receives the pairing change request packet, it first determines whether it can provide relay services for the relay node 3230 and its descendant node. When the relay node 3222*b* determines that it can provide relay services for the relay node 3230 and its descendant node, it adds the MAC addresses of the relay node 3230 and its descendant node to the refugee table stored by itself, and then generates and sends the second pairing approval packet downstream since the relay node 3222b is a root node, wherein a sending address of the second pairing approval packet is the MAC address of the relay node 3222b, and a receiving address of the second pairing approval packet is the MAC address of the relay node 3230.

After receiving the second pairing approval packet, the relay node 3222a first determines that the sending address of the second pairing approval packet is the MAC address of its parent node and the receiving address of the second pairing approval packet is the MAC address contained in the refugee table stored by itself, and then changes the sending address of the received second pairing approval packet from the MAC address of the relay node 3222b to the MAC address of the relay node 3222a, and finally forwards the changed second pairing approval packet to the relay node 3230 downstream.

When the timer does not expire and the relay node 3230 receives the second pairing approval packet, it means that the relay node 3230 has successfully paired with the relay node 3222a.

Since the root node corresponding to the relay node 3222a is different from the root node corresponding to the relay node 3212a, the relay node 3222b may generate and send a pairing switching packet carrying a pairing switch identifier, the MAC addresses of the relay node 3230 and its descendant node, and the MAC address of the relay node 3212a to the access point 3210 while or after generating and sending the second pairing approval packet downstream, so that the access point 3210 forwards the pairing switching packet to the relay node 3212b, wherein a receiving address of the pairing switching packet is the MAC address of the access point 3210, a sending address of the pairing switching packet is the MAC address of the relay node 3222b, and a destination address of the pairing switching packet is the MAC address of the relay node 3212b.

After the relay node 3212b receives the pairing switching packet, it deletes the MAC addresses of the relay node 3230 and its descendant node from the refugee table stored by itself, and generates and sends a second pairing cancellation packet carrying the MAC addresses of the relay node 3230 and its descendant node, and the MAC address of the relay node 3222a downstream, wherein a receiving address of the second pairing cancellation packet is the MAC address of the relay node 3212a and a sending address of the second pairing cancellation packet is the MAC address of the relay node 3212b.

After receiving the second pairing cancellation packet, the relay node 3212a deletes the MAC addresses of the relay node 3230 and its descendant node from the refugee table stored by itself.

Please refer to FIG. 24, which is a flow chart of a method for switching pairing in a mesh network system according to a third embodiment of the present disclosure. In addition to step 201 to step 208 and step 208a in FIG. 17 and FIG. 18, the method for switching pairing in the mesh network system may further comprise: step 225 to step 228. It should be noted that, in order to avoid the drawing in FIG. 24 being too complicated, steps 201 to 208 and 208a are omitted to be drawn.

In step 225, when the root node corresponding to the new parent node is not the same as the root node corresponding to the old parent node, the root node corresponding to the new parent node further generates and sends a second pairing cancellation packet carrying the MAC addresses of the network node and its descendant node to the old root node, wherein a receiving address of the second pairing cancellation packet is the MAC address of the old parent node, and a sending address of the second pairing cancellation packet is the MAC address of the access point. The manner in which the root node corresponding to the new parent node generates the second pairing cancellation packet in step 225 may be the same as the manner in which the old root node generates the second pairing cancellation packet in step 211, and details will not be repeated here.

In one embodiment, after the network node confirms that the pairing switching is successful (that is, step 208 or step 208a), it additionally notifies the new root node to perform step 225. In another embodiment, no matter whether the pairing switching is successful or not, the root node corresponding to the new parent node may generate and send the second pairing cancellation packet while or after generating and sending the second pairing approval packet downstream.

In step 226, the old root node that receives the second pairing cancellation packet deletes the MAC addresses of the network node and its descendant node from the refugee table stored by itself, changes the sending address of the second pairing cancellation packet to the MAC address of itself, and then forwards the second pairing cancellation packet downstream.

In step 227, the relay node that receives the second pairing cancellation packet deletes the MAC addresses of the network node and its descendant node from the refugee table stored by itself, changes the sending address of the second pairing cancellation packet to the MAC address of itself, and then forwards the second pairing cancellation packet downstream until the old parent node receives the second pairing cancellation packet.

In step 228, after receiving the second pairing cancellation packet, the old parent node deletes the MAC addresses of the network node and its descendant node from the refugee table stored by itself.

Therefore, by the configuration of step 225, the new parent node directly generates and sends the second pairing cancellation packet carrying the MAC addresses of the network node and its descendant node to the old root node, instead of the step 210 of generating and sending, by the new parent node, the pairing switching packet to the access point, so that the access point forwards the pairing switching packet to the old root node, and the step 211 of generating and sending, by the old root node, the second pairing cancellation packet downstream.

Figure 25:
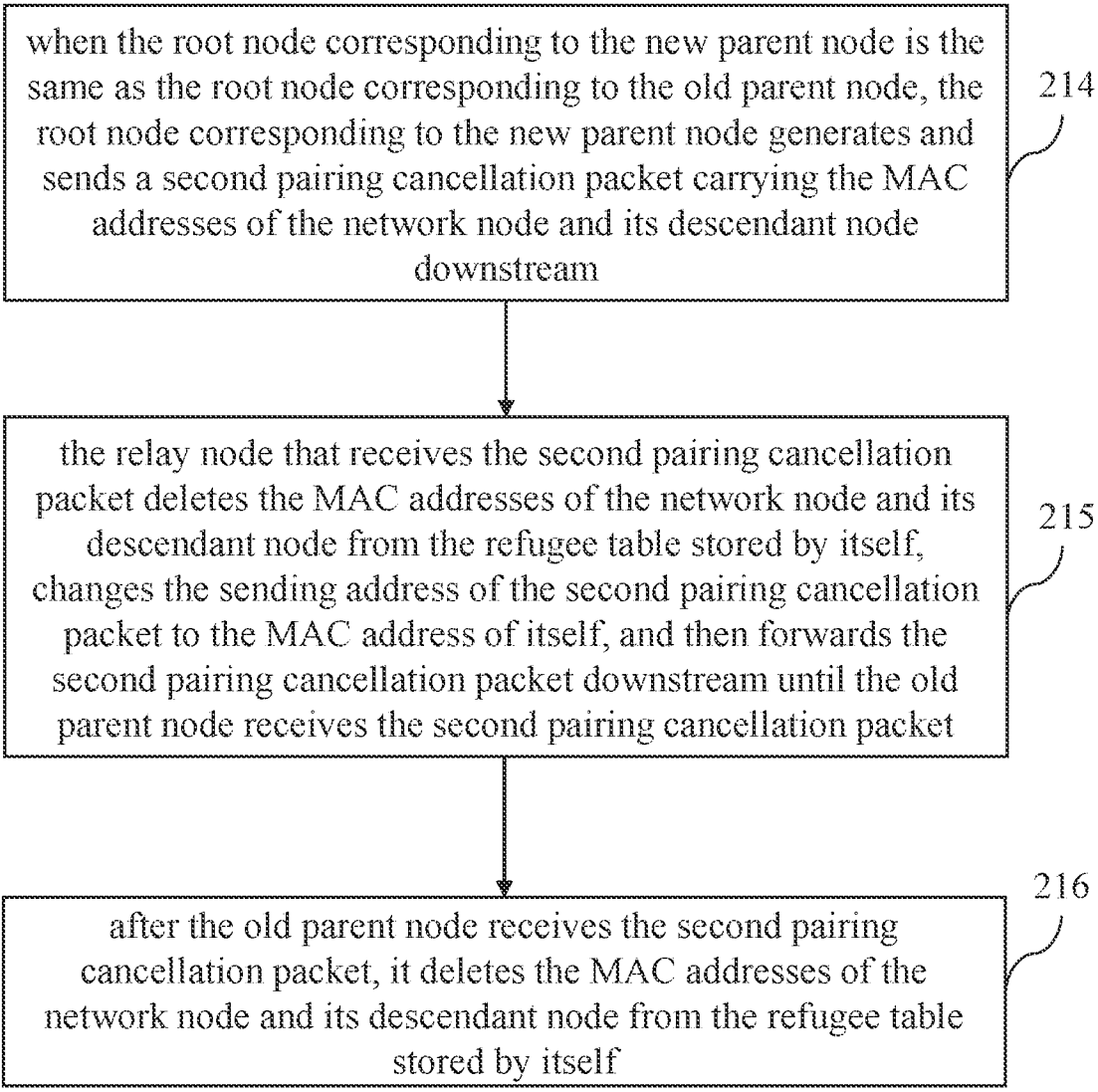
FIG. 25 is a flow chart of a method for switching pairing in a mesh network system according to a fourth embodiment of the present disclosure.

Please refer to FIG. 25, which is a flow chart of a method for switching pairing in a mesh network system according to a fourth embodiment of the present disclosure. In addition to step 201 to step 208 and step 208a in FIG. 17 and FIG. 18, the method for switching pairing in the mesh network system may further comprise: step 214 to step 216. It should be noted that, in order to avoid the drawing in FIG. 24 being too complicated, step 201 to step 208 and step 208a are omitted to be drawn.

In step 214, when the root node corresponding to the new parent node is the same as the root node corresponding to the old parent node, the root node corresponding to the new parent node generates and sends a second pairing cancellation packet carrying the MAC addresses of the network node and its descendant node downstream, wherein a receiving address of the second pairing cancellation packet is the MAC address of the old parent node, and a sending address of the second pairing cancellation packet is the MAC address of itself; the format of the second pairing cancellation packet can be a frame defined by the 802.11 protocol, such as a data frame, a management frame, a control frame, and other self-defined frames; and the manner in which the root node corresponding to the new parent node generates the second pairing cancellation packet in step 214 may be the same as the manner in which the old root node generates the second pairing cancellation packet in step 211, and details will not be repeated here.

In one embodiment, after the network node confirms that the pairing switching is successful (that is, step 208 or step 208a), it additionally notifies the new root node to perform step 214. In another embodiment, no matter whether the pairing switching is successful or not, the root node corresponding to the new parent node may generate and send the second pairing cancellation packet downstream while or after generating and sending the second pairing approval packet downstream.

In step 215, the relay node that receives the second pairing cancellation packet deletes the MAC addresses of the network node and its descendant node from the refugee table stored by itself, changes the sending address of the second pairing cancellation packet to the MAC address of itself, and then forwards the second pairing cancellation packet downstream until the old parent node receives the second pairing cancellation packet.

In step 216, after the old parent node receives the second pairing cancellation packet, it deletes the MAC addresses of the network node and its descendant node from the refugee table stored by itself.

Therefore, the old parent node and its upper-level node(s) can delete the MAC addresses of the network node and its descendant node from the refugee table stored by itself in the process of pairing switching. That is, the old parent node and its upper-level node(s) do not provide relay services for the network node and its descendant node(s). In addition, since the root node corresponding to the new parent node is the same as the root node corresponding to the old parent node in this embodiment, the root node corresponding to the new parent node does not need to generate a pairing switching packet to the access point in this embodiment.

Figure 26:
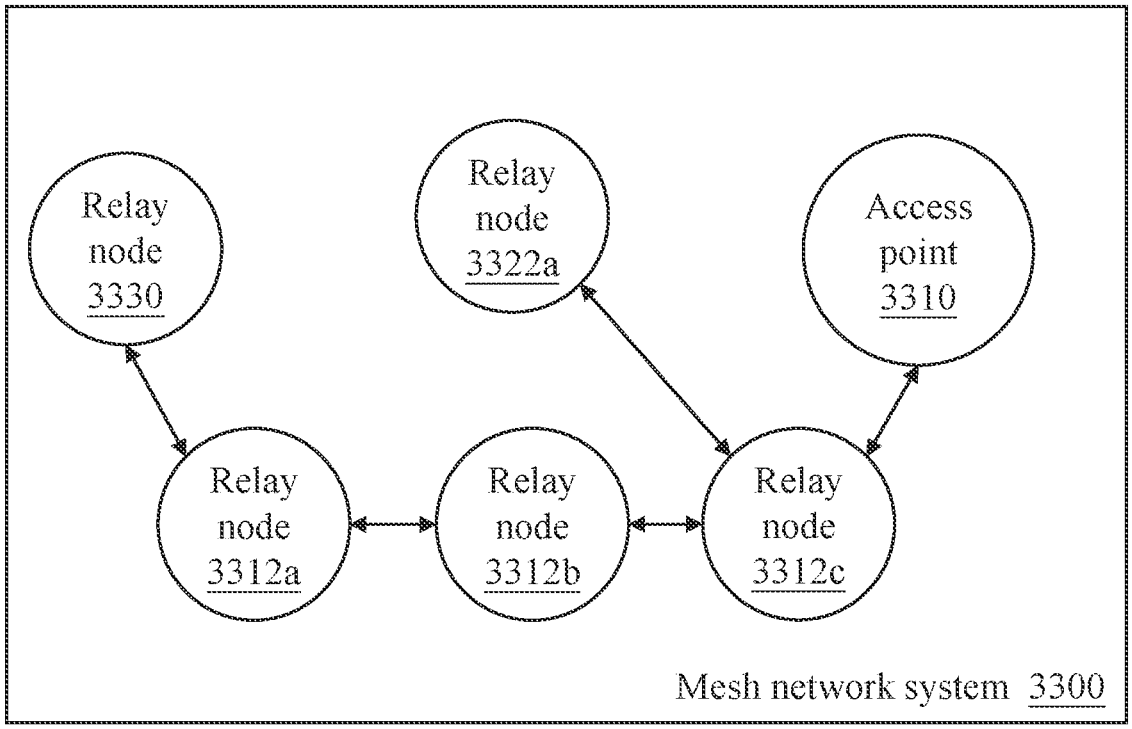
FIG. 26 and FIG. 27 are schematic diagrams of an embodiment of the mesh network system before and after applying the method for switching pairing in FIG. 25.
Figure 27:
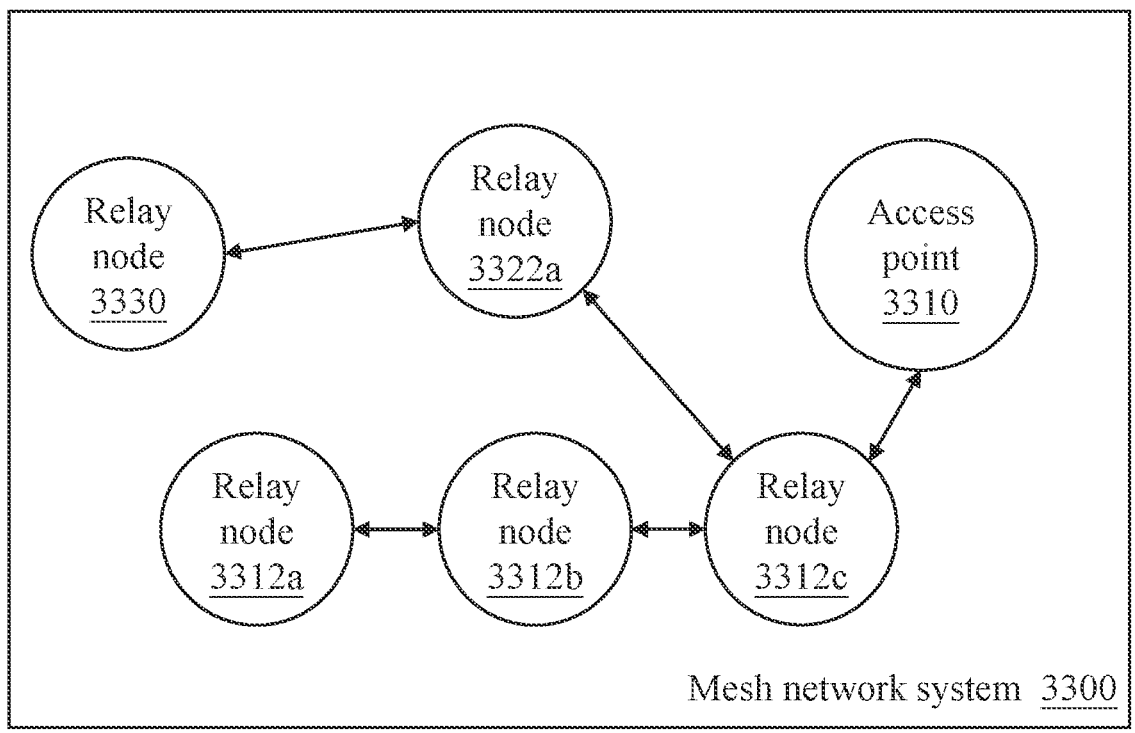

Please refer to FIG. 26 and FIG. 27, which are schematic diagrams of an embodiment of the mesh network system before and after applying the method for switching pairing in FIG. 25. The mesh network system 3300 comprises an access point 3310 and a plurality of network nodes, the plurality of network nodes can communicate with each other through the mesh network, and the plurality of network nodes comprise a plurality of relay nodes (that is, a relay nodes 3312a, a relay node 3312b, a relay node 3312c, a relay node 3322a, and a relay node 3330). The relay node 3312c serves as the root node communicating with the access point 3310, the parent node of the relay node 3312a is the relay node 3312b, the parent node of the relay node 3312b is the relay node 3312c, and the parent node of the relay node 3322a is the relay node 3312c. In the process of constructing the mesh network system 3300 based on the above method for pairing nodes, each of the relay node 3312a, the relay node 3312b, the relay node 3312c, the relay node 3322a, and the relay node 3330 stores the MAC address(es) of its descendant node(s) in its refugee table.

In FIG. 26, the parent node of the relay node 3330 is the relay node 3312a. In FIG. 27, the parent node of the relay node 3330 is changed to the relay node 3322a. The whole process of changing the parent node of the relay node 3330 from the relay node 3312a to the relay node 3322a is as follows.

When the relay node 3330 detects that the communication quality with the relay node 3312a is poor or receives the first pairing cancellation packet from the relay node 3312a, it performs a scanning procedure to select the relay node 3322a, so that the relay node 3312a becomes the old parent node.

The relay node 3330 is configured to only receive an uplink packet whose receiving address is the MAC address of the relay node 3330, or a packet with a sending address being the MAC address of the relay node 3322a and a receiving address being the MAC address of the relay node 3330.

Since the relay node 3322a is not an access point, the relay node 3330 generates and sends a pairing change request packet carrying the MAC address of its descendant node, the MAC address of the relay node 3330, and the MAC address of the relay node 3312a to the relay node 3322a, and starts a timer, wherein a sending address of the pairing change request packet is the MAC address of the relay node 3330 and a receiving address of the pairing change request packet is the MAC address of the relay node 3322a.

After the relay node 3322a receives the pairing change request packet, it first determines whether it can provide the relay services for the relay node 3330 and its descendant node. When the relay node 3322a determines that it can provide the relay services for the relay node 3330 and its descendant node, it adds the MAC addresses of the relay node 3330 and its descendant node to the refugee table stored by itself, and then determines that it is not the root node. Therefore, the relay node 3322a changes the receiving address of the received pairing change request packet from the MAC address of the relay node 3322a to the MAC address of its parent node, and then forwards the changed pairing change request packet upstream.

After the relay node 3312c receives the pairing change request packet, it first determines whether it can provide the relay services for the relay node 3330 and its descendant node. When the relay node 3312c determines that it can provide the relay services for the relay node 3330 and its descendant node, it adds the MAC addresses of the relay node 3330 and its descendant node to the refugee table stored by itself, and then generates and sends the second pairing approval packet downstream since the relay node 3312c is the root node, wherein the sending address of the second pairing approval packet is the MAC address of the relay node 3312c, and the receiving address of the second pairing approval packet is the MAC address of the relay node 3330.

After receiving the second pairing approval packet, the relay node 3322a first determines that the sending address of the second pairing approval packet is the MAC address of its parent node and the receiving address is the MAC address contained in the refugee table stored by itself, and then changes the sending address of the received second pairing approval packet from the MAC address of the relay node 3312c to the MAC address of the relay node 3322a, and finally forwards the changed second pairing approval packet to the relay node 3330 downstream.

When the timer does not expire and the relay node 3330 receives the second pairing approval packet, it means that the relay node 3330 has successfully paired with the relay node 3322a.

Since the root node corresponding to the relay node 3322a is the same as the root node corresponding to the relay node 3312a, the relay node 3312c generates and sends the second pairing cancellation packet, which carries the MAC addresses of the relay node 3330 and its descendant node and the MAC address of the relay node 3322a, downstream while or after it generates and sends the second pairing approval packet downstream. A receiving address of the second pairing cancellation packet is the MAC address of the relay node 3312a, and a sending address of the second pairing cancellation packet is the MAC address of the relay node 3312c.

After the relay node 3312b receives the second pairing cancellation packet, it deletes the MAC addresses of the relay node 3330 and its descendant node from the refugee table stored by itself, changes the sending address of the second pairing cancellation packet to the MAC address of the relay node 3312b, and then forwards the second pairing cancellation packet downstream to the relay node 3312a.

After receiving the second pairing cancellation packet, the relay node 3312a deletes the MAC addresses of the relay node 3330 and its descendant node from the refugee table stored by itself.

Please refer to FIG. 28, which is a flow chart of a method for switching pairing in a mesh network system according to a fifth embodiment of the present disclosure. In addition to step 201 to step 208 and step 208a in FIG. 17 and FIG. 18, the method for switching pairing in the mesh network system may further comprise: step 217 to step 219. It should be noted that, in order to avoid the drawing of FIG. 27 being too complicated, step 201 to step 208 and step 208a are omitted to drawn; and the pairing change request packet described in step 202 in this embodiment carries the MAC address of the descendant node of the network node, the MAC address of the old root node, the MAC address of the old parent node, and the MAC address of the new parent node, so as to facilitate the performance of the subsequent steps.

In step 217, when the root node corresponding to the new parent node is the same as the root node corresponding to the old parent node, the root node corresponding to the new parent node generates and sends a third pairing cancellation packet carrying the MAC addresses of the network node and its descendant node and the MAC address of the new parent node downstream, wherein a receiving address of the third pairing cancellation packet is the MAC address of the old parent node, and a sending address is a MAC address of itself; the format of the third pairing cancellation packet can be a frame defined by the 802.11 protocol, such as a data frame, a management frame, a control frame, and other self-defined frames; and the manner in which the root node corresponding to the new parent node generates the third pairing cancellation packet in step 217 is similar to the manner in which the old root node generates the second pairing cancellation packet in above step 211, and the difference between the two manners is that the expanded payload field of the third pairing cancellation packet is further filled with the MAC address of the new parent node.

In one embodiment, after the network node confirms that the pairing switching is successful (that is, step 208 or step 208a), it additionally notifies the new root node to perform step 217. In another embodiment, no matter whether the pairing switching is successful or not, the root node corresponding to the new parent node may generate and send the third pairing cancellation packet downstream while or after generating and sending the third pairing approval packet downstream.

In step 218, the relay node that receives the third pairing cancellation packet first determines whether the MAC address of itself is the same as the MAC address of the new parent node or determines whether the MAC address of the new parent node is contained in the refugee table stored by itself, and then forwards the third pairing cancellation packet downstream until the old parent node receives the third pairing cancellation packet, wherein if it determines that the MAC address of itself is the same as the MAC address of the new parent node or the MAC address of the new parent node is contained in the refugee table stored by itself, the relay node changes the sending address of the third pairing cancellation packet to the MAC address of itself, and then forwards the third pairing cancellation packet downstream; if it determines that the MAC address of itself is different from the MAC address of the new parent node or the MAC address of the new parent node is not contained in the refugee table stored by itself, the relay node deletes the MAC addresses of the network node and its descendant node from the refugee table stored by itself, changes the sending address of the third pairing cancellation packet to the MAC address of itself, and then forwards the third pairing cancellation packet downstream.

In step 219, after receiving the third pairing cancellation packet, the old parent node deletes the MAC addresses of the network node and its descendant node from the refugee table stored by itself.

Therefore, by the configuration of step 218, the situation where the new parent node and its upper-level node(s) mistakenly delete the MAC addresses of the network node and its descendant node from the refugee table stored by itself when the new parent node is the upper-level node of the old parent node is avoided.

Figure 29:
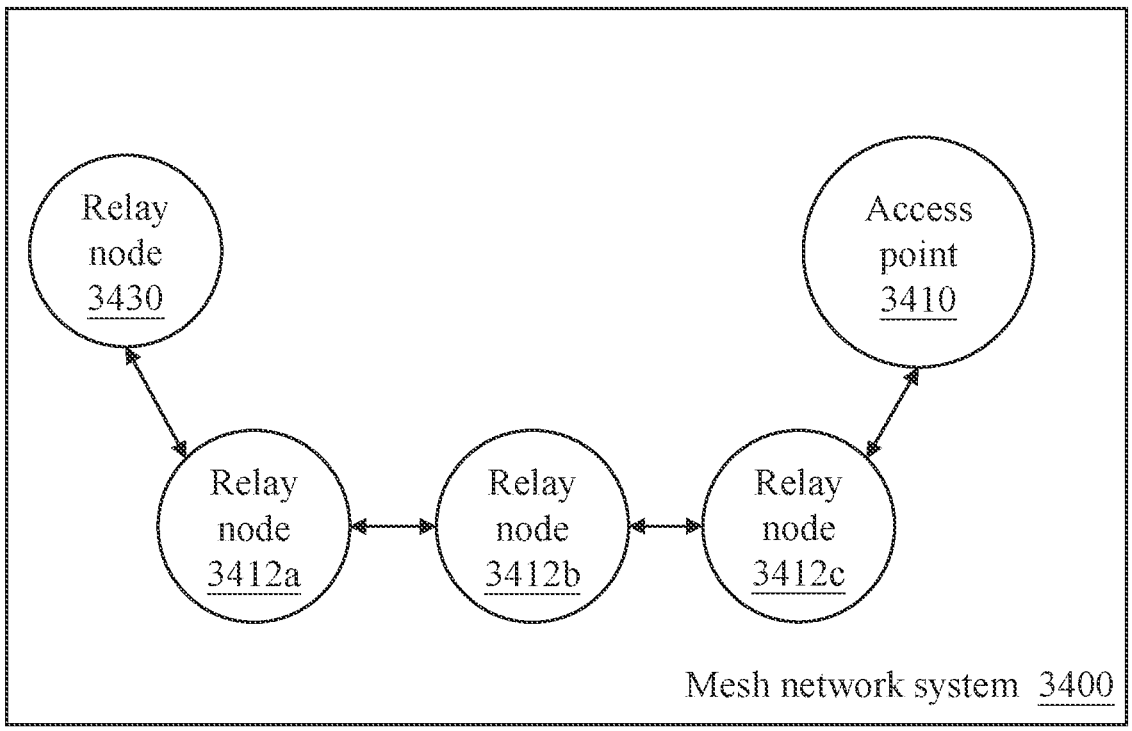
FIG. 29 and FIG. 30 are schematic diagrams of an embodiment of the mesh network system before and after applying the method for switching pairing in FIG. 28.
Figure 30:
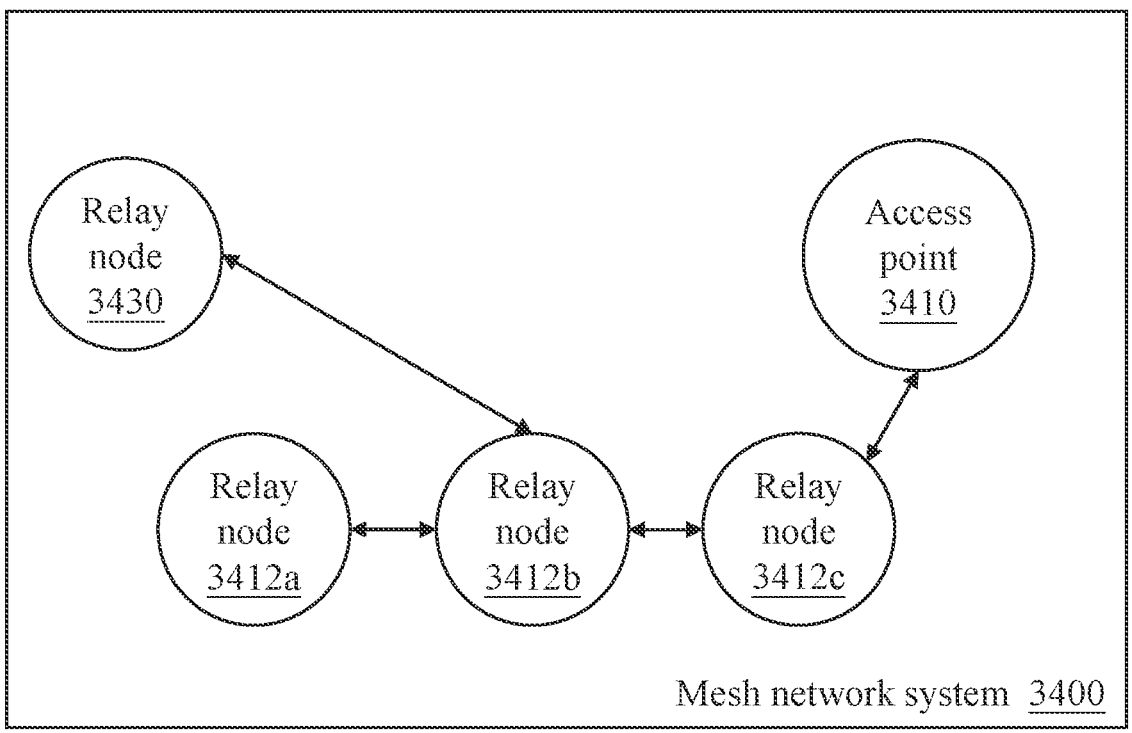

Please refer to FIG. 29 and FIG. 30, which are schematic diagrams of an embodiment of the mesh network system before and after applying the method for switching pairing in FIG. 28. The mesh network system 3400 comprises an access point 3410 and a plurality of network nodes, the plurality of network nodes can communicate with each other through the mesh network, and the plurality of network nodes comprises a plurality of relay nodes (that is, a relay nodes 3412a, a relay node 3412b, a relay node 3412c, and a relay node 3430). The relay node 3412c serves as the root node communicating with the access point 3410, the parent node of the relay node 3412a is the relay node 3412b, and the parent node of the relay node 3412b is the relay node 3412c. In the process of constructing the mesh network system 3400 based on the above-mentioned method for pairing nodes, each of the relay node 3412a, the relay node 3412b, the relay node 3412c and the relay node 3430 stores the MAC address(es) of its descendant node(s) in its refugee table.

In FIG. 29, the parent node of the relay node 3430 is the relay node 3412a. In FIG. 30, the parent node of the relay node 3430 is changed to the relay node 3412b. The whole process of changing the parent node of relay node 3430 from relay node 3412a to relay node 3412b is as follows.

When the relay node 3430 detects that the communication quality with the relay node 3412a is poor or receives the first pairing cancellation packet from the relay node 3412a, it performs a scanning procedure to select the relay node 3412b, so that the relay node 3412a becomes the old parent node.

The relay node 3430 is configured to only receive an uplink packet whose receiving address is the MAC address of the relay node 3430, or a packet with a sending address being the MAC address of the relay node 3412b, and a receiving address being the MAC address of the relay node 3430.

Since the relay node 3412b is not an access point, the relay node 3430 generates and sends a pairing change request packet carrying the MAC address of its descendant node, the MAC address of the relay node 3430, the MAC address of the relay node 3412*a*, and the MAC address of the relay node 3412*c* to the relay node 3412*b*, and starts a timer, wherein a sending address of the pairing change request packet is the MAC address of the relay node 3430, and a receiving address of the pairing change request packet is the MAC address of the relay node 3412*b*.

After the relay node 3412*b* receives the pairing change request packet, it first determines whether it can provide the relay services for the relay node 3430 and its descendant node. When the relay node 3412*b* determines that it can provide the relay services for the relay node 3430 and its descendant node, it adds the MAC addresses of the relay node 3430 and its descendant node to the refugee table stored by itself, and then determines that it is not a root node. Therefore, the relay node 3412*b* changes the receiving address of the received pairing change request packet from the MAC address of the relay node 3412*b* to the MAC address of its parent node, and then forwards the changed pairing change request packet upstream.

After the relay node 3412*c* receives the pairing change request packet, it first determines whether it can provide relay services for the relay node 3430 and its descendant node. When the relay node 3312*c* determines that it can provide the relay services for the relay node 3430 and its descendant node, it adds the MAC addresses of the relay node 3430 and its descendant node to the refugee table stored by itself, and then generates and sends the second pairing approval packet downstream since the relay node 3412*c* is a root node, wherein a sending address of the second pairing approval packet is the MAC address of the relay node 3412*c*, and a receiving address of the second pairing approval packet is the MAC address of the relay node 3430.

After receiving the second pairing approval packet, the relay node 3412*b* first determines that the sending address of the second pairing approval packet is the MAC address of its parent node and the receiving address of the second pairing approval packet is the MAC address contained in the refugee table stored by itself, and then changes the sending address of the received second pairing approval packet from the MAC address of the relay node 3412*c* to the MAC address of the relay node 3412*b*, and finally forwards the changed second pairing approval packet to the relay node 3430 downstream.

When the timer does not expire and the relay node 3430 receives the second pairing approval packet, it means that the relay node 3430 has successfully paired with the relay node 3412*b*.

Since the root node corresponding to the relay node 3412*b* is the same as the root node corresponding to the relay node 3412*a*, the relay node 3412*c* generates and sends a third pairing cancellation packet, which carries the MAC addresses of the relay node 3430 and its descendant node and the MAC address of the relay node 3412*b*, downstream while or after it generates and sends the second pairing approval packet downstream, wherein a receiving address of the third pairing cancellation packet is the MAC address of the relay node 3412*a* and a sending address of the third pairing cancellation packet is the MAC address of the relay node 3412*c*.

After the relay node 3412*b* receives the third pairing cancellation packet, it determines that it is the new parent node (that is, it determines that the MAC address of the new parent node (relay node 3412*b*) of the third pairing cancellation packet is the MAC address of itself), and changes the sending address to the MAC address of the relay node 3412*b*, and then forwards the third pairing cancellation packet downstream.

After receiving the third pairing cancellation packet, the relay node 3412*a* deletes the MAC addresses of the relay node 3430 and its descendant node from the refugee table stored by itself.

Figure 31:
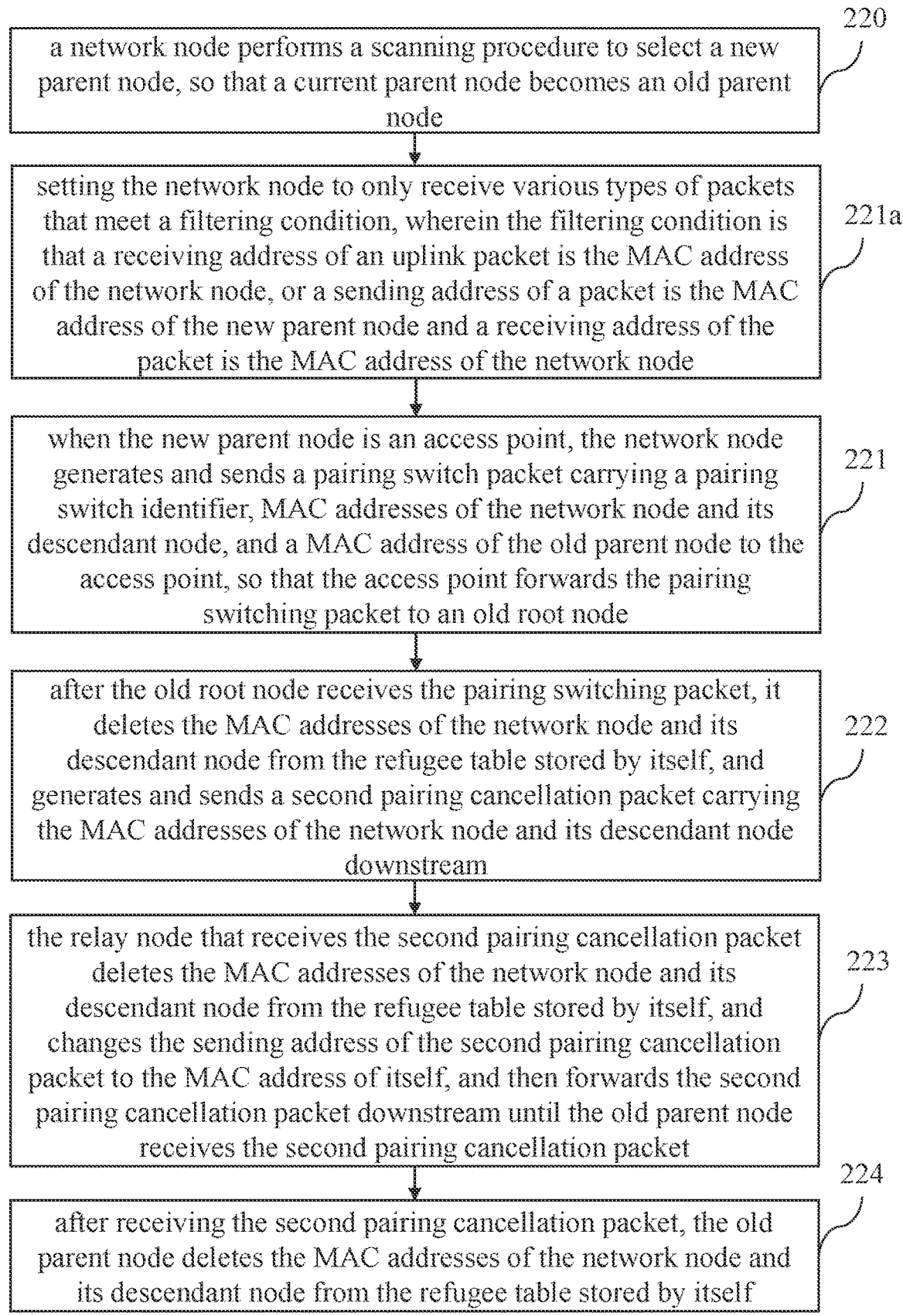
FIG. 31 is a flow chart of a method for switching pairing in a mesh network system according to a sixth embodiment of the present disclosure.

Please refer to FIG. 31, which is a flow chart of a method for switching pairing in a mesh network system according to a sixth embodiment of the present disclosure. As shown in FIG. 31, the method for switching pairing in the mesh network system comprises: step 220 to step 224.

In step 220, a network node performs a scanning procedure to select a new parent node, so that a current parent node becomes an old parent node. Step 220 is the same as step 201, and details will not be repeated here.

In step 221, when the new parent node is an access point, the network node generates and sends a pairing switch packet carrying a pairing switch identifier, MAC addresses of the network node and its descendant node, and a MAC address of the old parent node to the access point, so that the access point forwards the pairing switching packet to an old root node, wherein a receiving address of the pairing switching packet is a MAC address of the access point, a sending address of the pairing switching packet is a MAC address of the network node, and a destination address of the pairing switching packet is a MAC address of the old root node. The pairing switching packet can be, but not limited to, a normal packet defined by 802.11 protocol or a QoS packet. The manner in which the network node generates the pairing switching packet in step 221 is the same as the manner in which the root node corresponding to the new parent node generates the pairing switching packet in step 210, and details will not be repeated here.

In step 222, after the old root node receives the pairing switching packet, it deletes the MAC addresses of the network node and its descendant node from the refugee table stored by itself, and generates and sends a second pairing cancellation packet carrying the MAC addresses of the network node and its descendant node downstream, wherein a receiving address of the second pairing cancellation packet is the MAC address of the old parent node, and a sending address of the second pairing cancellation packet is the MAC address of the old root node. The format of the second pairing cancellation packet can be a frame defined by the 802.11 protocol, such as a data frame, a management frame, a control frame, and other self-defined frames. The manner in which the old root node generates the second pairing cancellation packet in step 222 is the same as the manner in which the old root node generates the second pairing cancellation packet in step 211, and details will not be repeated here.

In step 223, the relay node that receives the second pairing cancellation packet deletes the MAC addresses of the network node and its descendant node from the refugee table stored by itself, and changes the sending address of the second pairing cancellation packet to the MAC address of itself, and then forwards the second pairing cancellation packet downstream until the old parent node receives the second pairing cancellation packet.

In step 224, after receiving the second pairing cancellation packet, the old parent node deletes the MAC addresses of the network node and its descendant node from the refugee table stored by itself.

In one embodiment, after the above-mentioned step 220, the method for switching pairing in the mesh network system may further comprise: setting the network node to only receive various types of packets that meet a filtering condition, wherein the filtering condition is that a receiving address of an uplink packet is the MAC address of the network node, or a sending address of a packet is the MAC address of the new parent node and a receiving address of the packet is the MAC address of the network node (step 221a).

Figure 32:
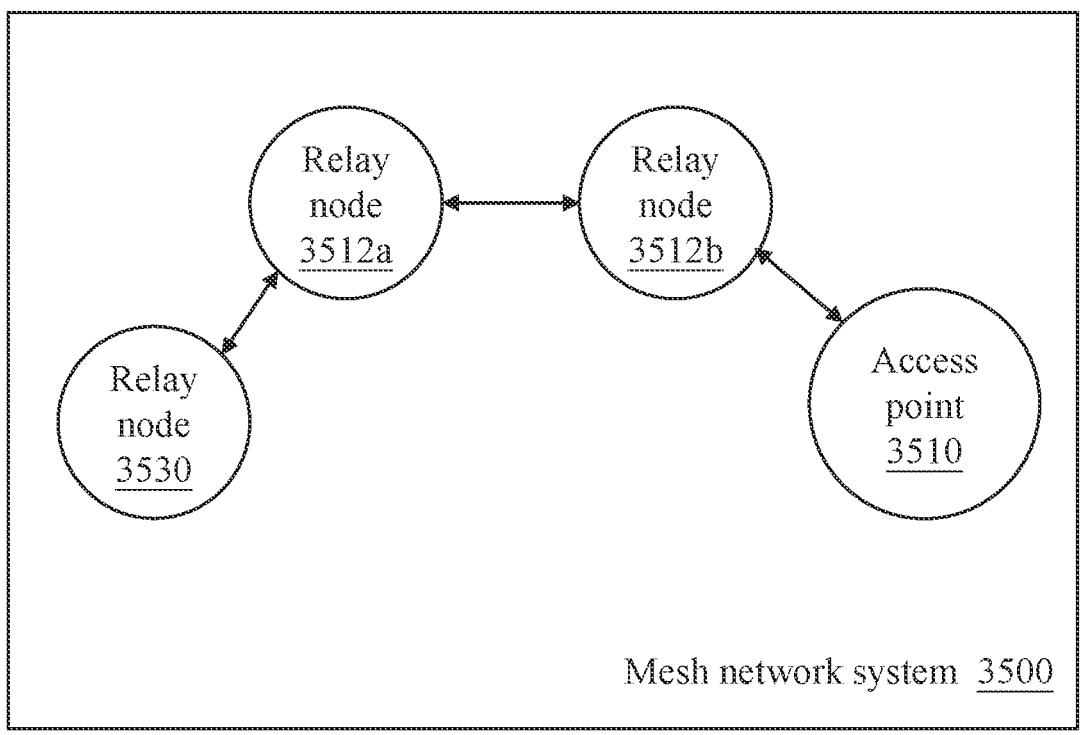
FIG. 32 and FIG. 33 are schematic diagrams of an embodiment of the mesh network system before and after applying the method for switching pairing in FIG. 31.
Figure 33:
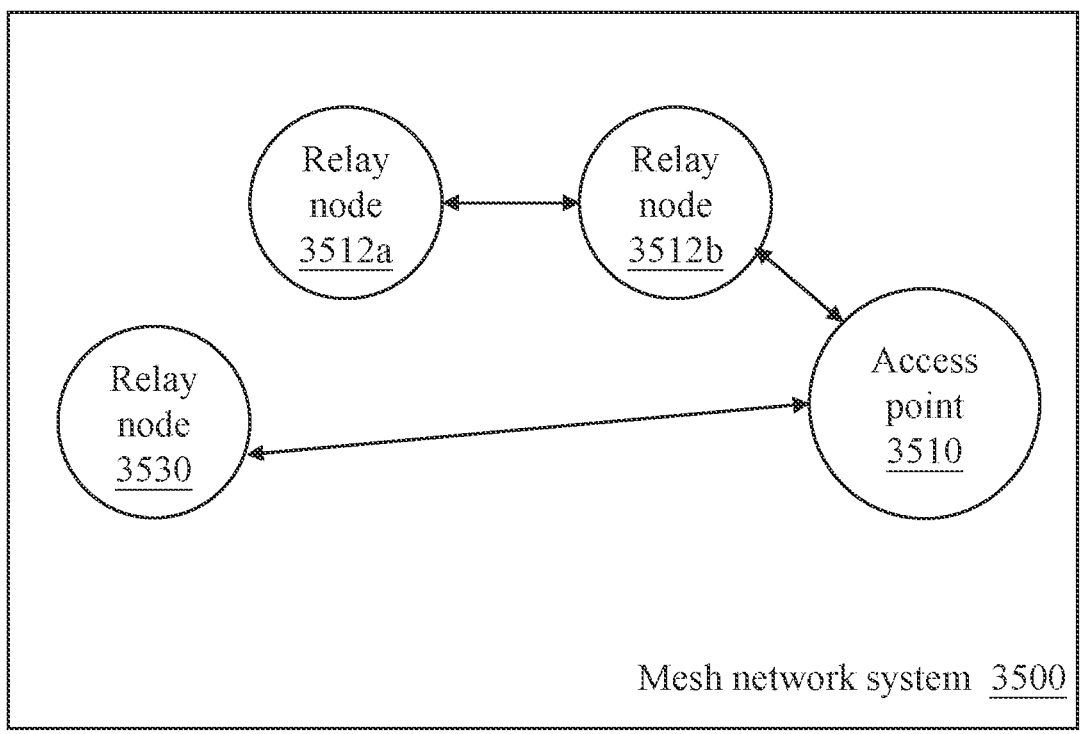

Please refer to FIG. 32 and FIG. 33, which are schematic diagrams of an embodiment of the mesh network system before and after applying the method for switching pairing in FIG. 31. The mesh network system 3500 comprises an access point 3510 and a plurality of network nodes, the plurality of network nodes can communicate with each other through the mesh network, and the plurality of network nodes comprise a plurality of relay nodes (that is, a relay node 3512a, a relay node 3512b and a relay node 3530). The relay node 3512b serves as the root node communicating with the access point 3510, and the parent node of the relay node 3512a is the relay node 3512b. In the process of constructing the mesh network system 3500 based on the above-mentioned method for pairing nodes, each of the relay node 3512a, the relay node 3512b and the relay node 3530 stores the MAC address(es) of its descendant node(s) in its refugee table.

In FIG. 32, the parent node of the relay node 3530 is the relay node 3512a. In FIG. 33, the parent node of the relay node 3530 is changed to the access point 3510, and the relay node 3530 is changed to the new root node. The whole process of changing the parent node of the relay node 3530 from the relay node 3512a to the access point 3510 is as follows.

When the relay node 3530 detects that the communication quality with the relay node 3512a is poor or receives the first pairing cancellation packet from the relay node 3512a, it performs the scanning procedure to select the access point 3510, so that the relay node 3512a becomes the old parent node.

The relay node 3530 is configured to only receive an uplink packet whose receiving address is the MAC address of the relay node 3530, or a packet with a sending address being the MAC address of the access point 3510 and a receiving address being the MAC address of the relay node 3530.

Since the new parent node of the relay node 3530 is an access point, the relay node 3530 generates and sends a pairing switching packet carrying a pairing switch identifier, the MAC addresses of the relay node 3530 and its descendant node, and the MAC address of the relay node 3512a to the access point 3510, so that the access point 3510 forwards the pairing switching packet to the relay node 3512a, wherein a receiving address of the pairing switching packet is the MAC address of the access point 3510, a sending address of the pairing switching packet is the relay node 3530, and a destination address of the pairing switching packet is the MAC address of relay node 3512b.

After the relay node 3512b receives the pairing switching packet, it deletes the MAC addresses of the network node and its descendant node from the refugee table stored by itself, and generates and sends a second pairing cancellation packet carrying the MAC addresses of the relay node 3530 and its descendant node and the MAC address of the access point 3510 downstream, wherein a receiving address of the second pairing cancellation packet is the MAC address of the relay node 3512a, and a sending address of the second pairing cancellation packet is the MAC address of the relay node 3512b.

The relay node 3512a that receives the second pairing cancellation packet deletes the MAC addresses of the relay node 3530 and its descendant node from the refugee table stored by itself.

Figure 34:
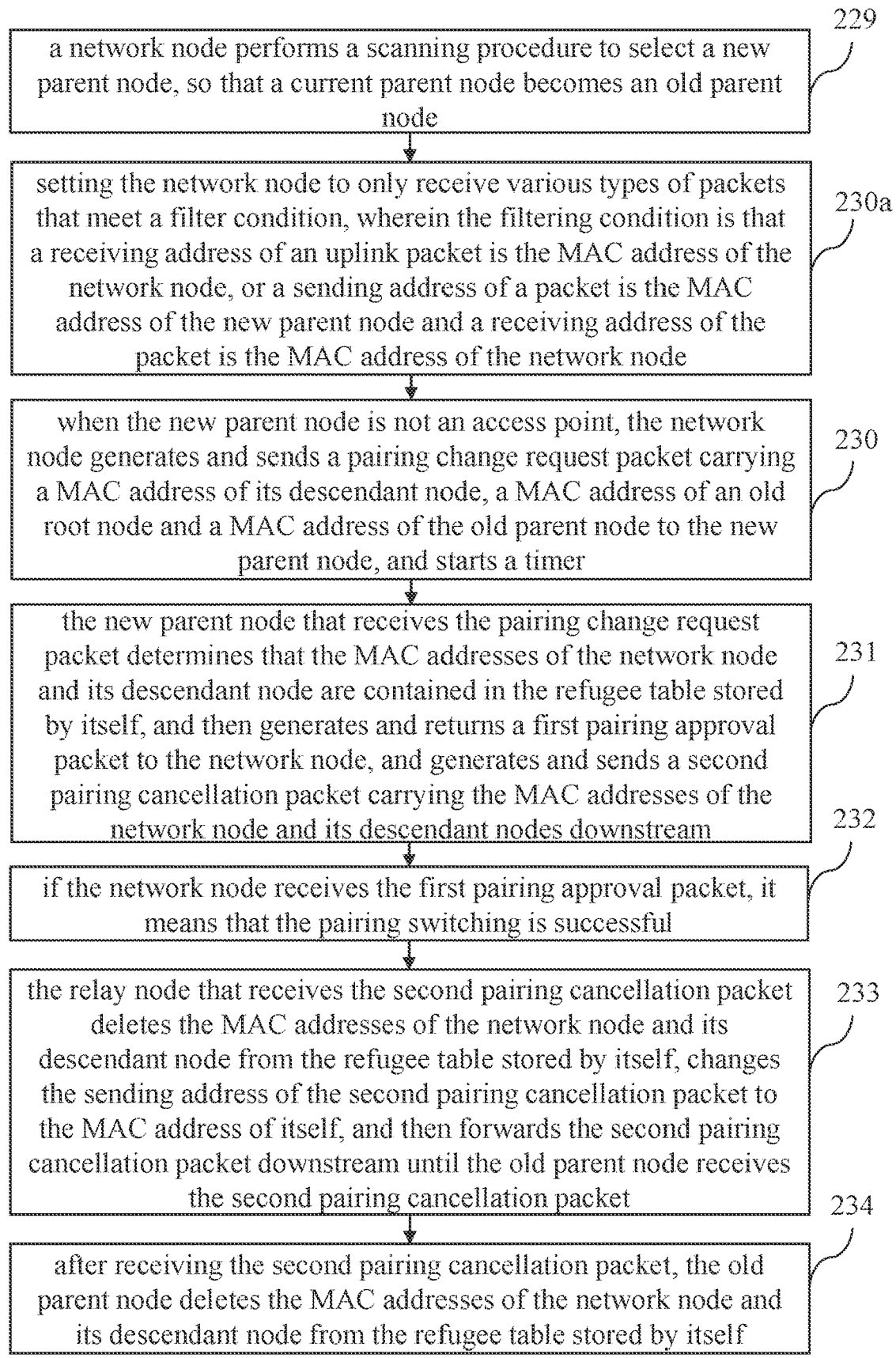
FIG. 34 is a flow chart of a method for switching pairing in a mesh network system according to a seventh embodiment of the present disclosure.

Please refer to FIG. 34, which is a flow chart of a method for switching pairing in a mesh network system according to a seventh embodiment of the present disclosure. As shown in FIG. 34, the method for switching pairing in the mesh network system comprises: step 229 to step 234.

In step 229, a network node performs a scanning procedure to select a new parent node, so that a current parent node becomes an old parent node. Step 229 is the same as step 201, and details will not be repeated here.

In step 230, when the new parent node is not an access point, the network node generates and sends a pairing change request packet carrying a MAC address of its descendant node, a MAC address of an old root node and a MAC address of the old parent node to the new parent node, and starts a timer, wherein a sending address of the pairing change request packet is a MAC address of the network node, and a receiving address of the pairing change request packet is a MAC address of the new parent node, and the old root node is a root node corresponding to the old parent node. Step 220 is the same as step 202, and details will not be repeated here.

In step 231, the new parent node that receives the pairing change request packet determines that the MAC addresses of the network node and its descendant node are contained in the refugee table stored by itself, and then generates and returns a first pairing approval packet to the network node, and generates and sends a second pairing cancellation packet carrying the MAC addresses of the network node and its descendant nodes downstream, wherein the refugee table stored by the new parent node comprises the MAC addresses of all subordinate nodes that the new parent node can provide relay services for, a sending address of the first pairing approval packet is the MAC address of the new parent node, a receiving address of the first pairing approval packet is the MAC address of the network node, a receiving address of the second pairing cancellation packet is the MAC address of the old parent node, and a sending address of the second pairing cancellation packet is the MAC address of the new parent node. The manner in which the root node corresponding to the new parent node generates the second pairing cancellation packet in step 231 is the same as the manner in which the old root node generates the second pairing cancellation packet in step 211, and details will not be repeated here.

In this embodiment, since the new parent node is an upper-level node of the old parent node, the new parent node can generate the first pairing approval packet and the second pairing cancellation packet, without the situation where the root node corresponding to the new parent node generates the first pairing approval packet and the second pairing cancellation packet.

In step 232, if the network node receives the first pairing approval packet, it means that the pairing switching is successful.

In step 233, the relay node that receives the second pairing cancellation packet deletes the MAC addresses of the network node and its descendant node from the refugee table stored by itself, changes the sending address of the second pairing cancellation packet to the MAC address of itself, and then forwards the second pairing cancellation packet downstream until the old parent node receives the second pairing cancellation packet.

In step 234, after receiving the second pairing cancellation packet, the old parent node deletes the MAC addresses of the network node and its descendant node from the refugee table stored by itself.

In one embodiment, after the above-mentioned step 229, the method for switching pairing in the mesh network system may further comprise: setting the network node to only receive various types of packets that meet a filter condition, wherein the filtering condition is that a receiving address of an uplink packet is the MAC address of the network node, or a sending address of a packet is the MAC address of the new parent node and a receiving address of the packet is the MAC address of the network node (step 230a).

It should be noted that, if there is no causal relationship between the above steps, the present disclosure does not limit the order of execution thereof.

In summary, in the embodiments of the present disclosure, the method for switching pairing in the mesh network system can be applied to a mesh network that carries out packet forwarding based on the MAC address. By the design of the pairing switching packet, the pairing change request packet, the first pairing approval packet, the second pairing approval packet, the first pairing cancellation packet and the second pairing cancellation packet, the corresponding processing logic is proposed for the nodes in the mesh network system to complete the update of the refugee tables of the relevant nodes in the mesh network during the pairing switching process, which can realize fast, stable and efficient pairing switch.

Although the present disclosure is disclosed in the foregoing embodiments, it is not intended to limit the present disclosure. Changes and modifications made without departing from the spirit and scope of the present disclosure belong to the scope of the claims of the present disclosure. The scope of protection of the present disclosure should be construed based on the following claims.

What is claimed is:

1. A method for switching pairing in a mesh network system, comprising:
    performing, by a network node, a scanning procedure to select a new parent node, so that a current parent node becomes an old parent node;
    generating and sending, by the network node, a pairing change request packet carrying a MAC address of a descendant node of the network node, a MAC address of an old root node, and a MAC address of the old parent node to the new parent node when the new parent node is not an access point, wherein a sending address of the pairing change request packet is a MAC address of the network node, a receiving address of the pairing change request packet is a MAC address of the new parent node, and the old root node is a root node corresponding to the old parent node;
    generating and returning, by the new parent node receiving the pairing change request packet, a first pairing approval packet to the network node after determining that the MAC addresses of the network node and its descendant node are contained in a refugee table stored by itself, and generating and sending a second pairing cancellation packet carrying the MAC addresses of the network node and its descendant node downstream, wherein the refugee table stored by the new parent node contains MAC addresses of all subordinate nodes that the new parent node provides relay services for, a sending address of the first pairing approval packet is the MAC address of the new parent node, a receiving address of the first pairing approval packet is the MAC address of the network node, a receiving address of the second pairing cancellation packet is the MAC address of the old parent node, and a sending address of the second pairing cancellation packet is the MAC address of the new parent node;
    wherein pairing switching is successful if the network node receives the first pairing approval packet;
    deleting, by a relay node receiving the second pairing cancellation packet, the MAC addresses of the network node and its descendant nodes from a refugee table stored by itself, changing the sending address of the second pairing cancellation packet to a MAC address of itself, and then forwarding the second pairing cancellation packet downstream until the old parent node receives the second pairing cancellation packet; and
    deleting, by the old parent node, the MAC addresses of the network node and its descendant node from a refugee table stored by itself after receiving the second pairing cancellation packet.

2. The method according to claim 1, further comprising:
    generating and returning, by the new parent node, a first pairing approval packet to the network node when the new parent node is a root node, wherein a sending address of the first pairing approval packet is the MAC address of the new parent node and a receiving address of the first pairing approval packet is the MAC address of the network node; and
    forwarding, by the new parent node, the pairing change request packet upstream after changing the receiving address the pairing change request packet to a MAC address of its parent node when the new parent node is not the root node;
    wherein pairing switching is successful when the network node receives the first pairing approval packet.

3. The method according to claim 1, wherein the step of generating and sending, by the network node, the pairing change request packet carrying the MAC address of its descendant node, the MAC address of the old root node, and the MAC address of the old parent node to the new parent node further comprises:
    filling, by the network node, an address 1 field in a null data frame with the MAC address of the new parent node, filling an address 2 field in the null data frame with the MAC address of the network node, setting a first preset bit of an address 3 field in the null data frame to a first preset value to define the null data frame as a handshake frame, setting a plurality of second preset bits of the address 3 field in the null data frame to a third preset value to define a type of the handshake frame as a pairing request, and filling an payload field in the null data frame, which is expanded, with the MAC address of the descendant node of the network node, the MAC address of the old root node, and the MAC address of the old parent node, so as to generate and send the pairing change request packet to the new parent node.

4. The method according to claim 2, wherein the step of generating and returning, by the new parent node, the first pairing approval packet to the network node when the new parent node is the root node further comprises:
    filling, by the new parent node, an address 1 field in a null data frame with the MAC address of the network node, filling an address 2 field in the null data frame with the MAC address of the new parent node, setting a first preset bit of an address 3 field in the null data frame to a first preset value to define the null data frame as a handshake frame, and setting a plurality of second preset bits of the address 3 field in the null data frame to a fourth preset value to define a type of the handshake frame as pairing approval, so as to generate and return the first pairing approval packet.

5. The method according to claim 1, further comprising:
generating and returning, by the new parent node receiving the pairing change request packet, a pairing rejection packet to the network node when determining that it cannot provide relay services for the network node and its descendant node, wherein a sending address of the pairing rejection packet is a MAC address of itself, and a receiving address of the pairing rejection packet is the MAC address of the network node;
wherein pairing switching is failure when the network node receives the pairing rejection packet.

6. The method according to claim 1, wherein after the step of performing, by the network node, the scanning procedure to select the new parent node, so that the current parent node becomes the old parent node, the method for switching pairing in the mesh network system further comprises:
setting the network node to only receive various types of packets that meet a filtering condition, wherein the filtering condition is that a receiving address of an uplink packet is the MAC address of the network node, or a sending address of a packet is the MAC address of the new parent node and a receiving address of the packet is the MAC address of the network node.

7. The method according to claim 1, wherein the step of performing, by the network node, the scanning procedure to select the new parent node, so that the current parent node becomes the old parent node further comprises:
obtaining, by the network node, communication information of each relay node in the mesh network system based on a plurality of beacon packets or a plurality of probe response packets obtained through the scanning procedure, wherein the communication information of each relay node comprises a signal strength between each relay node and the access point, a signal strength between the network node and each relay node, a level of each relay node in the mesh network system, relay service capability of each relay node, and/or a MAC address of each relay node; and
selecting, by the network node, a relay node as the new parent node based on the communication information of each relay node.

8. The method according to claim 1, wherein when the network node counts that an uplink packet transmission failure rate reaches a first threshold, energy of a packet received from the current parent node is lower than a second threshold, or a beacon is continuously lost for a period of time, it represents that the network node detects that communication quality with the current parent node is poor, so that the network node performs the scanning procedure to select the new parent node; and when the current parent node detects that communication quality with the network node is degraded or receives a connection replacement instruction, the current parent node outputs a first pairing cancellation packet to the network node, so that the network node performs the scanning procedure to select the new parent node.

9. The method according to claim 1, further comprising:
adding, by a relay node receiving the pairing change request packet, the MAC addresses of the network node and its descendant node to a refugee table stored by itself after determining that it can provide relay services for the network node and its descendant node, changing the receiving address of the pairing change request packet to a MAC address of its parent node, and then forwarding the pairing change request packet upstream until a root node corresponding to the new parent node receives the pairing change request packet, so that the root node corresponding to the new parent node adds the MAC addresses of the network node and its descendant node to a refugee table stored by itself after determining that it can provide relay services for the network node and its descendant node, and then generates and sends a second pairing approval packet downstream, wherein a sending address of the second pairing approval packet is a MAC address of the root node corresponding to the new parent node, and a receiving address of the second pairing approval packet is the MAC address of the network node; and
changing, by the relay node receiving the second pairing approval packet, the sending address of the second pairing approval packet to a MAC address of itself when determining that the sending address of the second pairing approval packet is the MAC address of its parent node and the receiving address of the second pairing approval packet is a MAC address contained in a refugee table stored by itself, and then forwarding the second pairing approval packet downstream until the network node receives the second pairing approval packet;
wherein pairing switching is successful if the network node receives the second pairing approval packet.

10. The method according to claim 9, further comprising:
generating and sending, by the root node corresponding to the new parent node, a pairing switching packet carrying a pairing switch identifier, the MAC addresses of the network node and its descendant node, and a MAC address of the old parent node to the access point when the root node corresponding to the new parent node is different from a root node corresponding to the old parent node, so that the access point forwards the pairing switching packet to the old root node, wherein a receiving address of the pairing switching packet is a MAC address of the access point, a sending address of the pairing switching packet is the MAC address of the root node corresponding to the new parent node, and a destination address of the pairing switching packet is the MAC address of the old root node;
deleting, by the old root node, the MAC addresses of the network node and its descendant node from a refugee table stored by itself after receiving the pairing switching packet, and generating and sending a second pairing cancellation packet carrying the MAC addresses of the network node and its descendant node downstream, wherein a receiving address of the second pairing cancellation packet is the MAC address of the old parent node, and a sending address of the second pairing cancellation packet is the MAC address of the old root node;
deleting, by a relay node receiving the second pairing cancellation packet, the MAC addresses of the network node and its descendant node from a refugee table stored by itself, changing the sending address of the second pairing cancellation packet to a MAC address of itself, and then forwarding the second pairing cancellation packet downstream until the old parent node receives the second pairing cancellation packet; and
deleting, by the old parent node, the MAC addresses of the network node and its descendant node from a refugee table stored by itself after receiving the second pairing cancellation packet.

11. The method according to claim 10, wherein the step of generating and sending, by the old root node, the second pairing cancellation packet carrying the MAC addresses of the network node and its descendant node downstream further comprises:

filling, by the old root node, an address 1 field in a null data frame with the MAC address of the old parent node, filling an address 2 field in the null data frame with the MAC address of the old root node, setting a first preset bit of an address 3 field in the null data frame to a first preset value to define the null data frame as a handshake frame, setting a plurality of second preset bits of the address 3 field in the null data frame to a fifth preset value to define a type of the handshake frame as a pairing cancellation, and filling a payload field in the null data frame, which is expanded, with the MAC addresses of the network node and its descendant node, so as to generate and send the second pairing cancellation packet downstream.

12. The method according to claim 10, wherein the step of generating and sending, by the root node corresponding to the new parent node, the pairing switching packet carrying the pairing switch identifier, the MAC addresses of the network node and its descendant node, and the MAC address of the old parent node to the access point further comprises:

filling, by the root node corresponding to the new parent node, an address 1 field in a data frame with the MAC address of the access point, filling an address 2 field in the data frame with the MAC address of the root node corresponding to the new parent node, filling an address 3 field in the data frame with the MAC address of the old root node, and filling a payload field in the data frame with the pairing switch identifier, the MAC addresses of the network node and its descendant node, and the MAC address of the old parent node, so as to generate and send the pairing switching packet to the access point.

13. The method according to claim 9, further comprising:
generating and sending, by the root node corresponding to the new parent node, a second pairing cancellation packet carrying the MAC addresses of the network node and its descendant node downstream when the root node corresponding to the new parent node is the same as a root node corresponding to the old parent node, wherein a receiving address of the second pairing cancellation packet is a MAC address of the old parent node, and a sending address of the second pairing cancellation packet is the MAC address of the root node corresponding to the new parent node;
deleting, by a relay node receiving the second pairing cancellation packet, the MAC addresses of the network node and its descendant node from a refugee table stored by itself, changing the sending address of the second pairing cancellation packet to a MAC address of itself, and then forwarding the second pairing cancellation packet downstream until the old parent node receives the second pairing cancellation packet; and
deleting, by the old parent node, the MAC addresses of the network node and its descendant node from a refugee table stored by itself after receiving the second pairing cancellation packet.

14. The method according to claim 9, further comprising:
generating and sending, by the root node corresponding to the new parent node, a third pairing cancellation packet carrying the MAC addresses of the network node and its descendant node and the MAC address of the new parent node when the root node corresponding to the new parent node is the same as a root node corresponding to the old parent node, wherein a receiving address of the third pairing cancellation packet is the MAC address of the old parent node, and a sending address of the third pairing cancellation packet is the root node corresponding to the new parent node;
determining, by a relay node receiving the third pairing cancellation packet, whether a MAC address of itself is the same as the MAC address of the new parent node or whether the MAC address of the new parent node is contained in a refugee table stored by itself, and then forwarding the third pairing cancellation packet downstream until the old parent node receives the third pairing cancellation packet; wherein if it determines that the MAC address of itself is the same as the MAC address of the new parent node or the MAC address of the new parent node is contained in the refugee table stored by itself, the relay node changes the sending address of the third pairing cancellation packet to the MAC address of itself, and then forwards the third pairing cancellation packet downstream; if it determines that the MAC address of itself is different from the MAC address of the new parent node or the MAC address of the new parent node is not contained in the refugee table stored by itself, the relay node deletes the MAC addresses of the network node and its descendant node from the refugee table stored by itself, changes the sending address of the third pairing cancellation packet to the MAC address of itself, and then forwards the third pairing cancellation packet downstream; and
deleting, by the old parent node, the MAC addresses of the network node and its descendant node from a refugee table stored by itself after receiving the third pairing cancellation packet.

15. The method according to claim 9, further comprising:
generating and sending, by the root node corresponding to the new parent node, a second pairing cancellation packet carrying the MAC addresses of the network node and its descendant node to the old root node when the root node corresponding to the new parent node is different from a root node corresponding to the old parent node, wherein a receiving address of the second pairing cancellation packet is the MAC address of the old parent node, and a sending address of the second pairing cancellation packet is a MAC address of the access point;
deleting, by the old root node receiving the second pairing cancellation packet, the MAC addresses of the network node and its descendant node from a refugee table stored by itself, changing the sending address of the second pairing cancellation packet to a MAC address of itself, and then forwarding the second pairing cancellation packet downstream;
deleting, by a relay node receiving the second pairing cancellation packet, the MAC addresses of the network node and its descendant node from a refugee table stored by itself, changing the sending address of the second pairing cancellation packet to a MAC address of itself, and then forwarding the second pairing cancellation packet downstream until the old parent node receives the second pairing cancellation packet; and
deleting, by the old parent node, the MAC addresses of the network node and its descendant node from a refugee table stored by itself after receiving the second pairing cancellation packet.

16. The method according to claim 9, further comprising:
generating and sending, by any one relay node receiving the pairing change request packet or the root node corresponding to the new parent node, a pairing rejection packet when determining that it cannot provide relay services for the network node and its descendant node;
wherein the pairing switching is failure when the network node receives the pairing rejection packet.

17. In a meshed network system for switching pairing, a node comprising a processor, memory, and software configured to:
perform a scanning procedure to select a new parent node, so that a current parent node becomes an old parent node;
generate and send a pairing change request packet carrying a MAC address of a descendant node of the network node, a MAC address of an old root node, and a MAC address of the old parent node to the new parent node when the new parent node is not an access point, wherein a sending address of the pairing change request packet is a MAC address of the network node, a receiving address of the pairing change request packet is a MAC address of the new parent node, and the old root node is a root node corresponding to the old parent node;
generating and returning, by the new parent node receiving the pairing change request packet, a first pairing approval packet to the network node after determining that the MAC addresses of the network node and its descendant node are contained in a refugee table stored by itself, and generating and sending a second pairing cancellation packet carrying the MAC addresses of the network node and its descendant node downstream, wherein the refugee table stored by the new parent node contains MAC addresses of all subordinate nodes that the new parent node provides relay services for, a sending address of the first pairing approval packet is the MAC address of the new parent node, a receiving address of the first pairing approval packet is the MAC address of the network node, a receiving address of the second pairing cancellation packet is the MAC address of the old parent node, and a sending address of the second pairing cancellation packet is the MAC address of the new parent node;
wherein pairing switching is successful if the network node receives the first pairing approval packet;
delete, by a relay node receiving the second pairing cancellation packet, the MAC addresses of the network node and its descendant nodes from a refugee table stored by itself, changing the sending address of the second pairing cancellation packet to a MAC address of itself, and then forwarding the second pairing cancellation packet downstream until the old parent node receives the second pairing cancellation packet; and
delete, by the old parent node, the MAC addresses of the network node and its descendant node from a refugee table stored by itself after receiving the second pairing cancellation packet.

18. The system according to claim 17, wherein the software is further configured to:
generating and returning, by the new parent node, a first pairing approval packet to the network node when the new parent node is a root node, wherein a sending address of the first pairing approval packet is the MAC address of the new parent node and a receiving address of the first pairing approval packet is the MAC address of the network node; and
forwarding, by the new parent node, the pairing change request packet upstream after changing the receiving address the pairing change request packet to a MAC address of its parent node when the new parent node is not the root node;
wherein pairing switching is successful when the network node receives the first pairing approval packet.

19. The system according to claim 17, wherein the operation generating and sending, by the network node, the pairing change request packet carrying the MAC address of its descendant node, the MAC address of the old root node, and the MAC address of the old parent node to the new parent node further comprises:
filling, by the network node, an address 1 field in a null data frame with the MAC address of the new parent node, filling an address 2 field in the null data frame with the MAC address of the network node, setting a first preset bit of an address 3 field in the null data frame to a first preset value to define the null data frame as a handshake frame, setting a plurality of second preset bits of the address 3 field in the null data frame to a third preset value to define a type of the handshake frame as a pairing request, and filling an payload field in the null data frame, which is expanded, with the MAC address of the descendant node of the network node, the MAC address of the old root node, and the MAC address of the old parent node, so as to generate and send the pairing change request packet to the new parent node.

20. The system according to claim 18, wherein the operation of generating and returning, by the new parent node, the first pairing approval packet to the network node when the new parent node is the root node further comprises:
filling, by the new parent node, an address 1 field in a null data frame with the MAC address of the network node, filling an address 2 field in the null data frame with the MAC address of the new parent node, setting a first preset bit of an address 3 field in the null data frame to a first preset value to define the null data frame as a handshake frame, and setting a plurality of second preset bits of the address 3 field in the null data frame to a fourth preset value to define a type of the handshake frame as pairing approval, so as to generate and return the first pairing approval packet.

* * * * *